United States Patent [19]

Hayashikoshi et al.

[11] Patent Number: 5,225,140
[45] Date of Patent: Jul. 6, 1993

[54] METHOD AND APPARATUS FOR MANUFACTURING A FIBER REINFORCED THERMOPLASTIC SHEET-SHAPED MOLDING BY USING SUCTION TO PARTIALLY IMPREGNATE A FIBER WEB

[75] Inventors: Noriaki Hayashikoshi; Masahiko Nishimori; Hisanobu Hori; Toshinori Ishii; Isao Ohnishi, all of Kurashiki, Japan

[73] Assignee: Kuraray Co., Ltd., Kurashiki, Japan
[21] Appl. No.: 677,344
[22] Filed: Mar. 29, 1991
[30] Foreign Application Priority Data Mar. 30, 1990 [JP] Japan .................. 2-85403
May 30, 1990 [JP] Japan ................. 2-141939

[51] Int. Cl.$^5$ .......................................... B29C 67/00
[52] U.S. Cl. .................................. 264/571; 118/50;
 118/101; 118/106; 118/122; 156/244.21;
 156/285; 156/500; 156/543; 264/136; 264/257;
 425/113; 425/371; 425/504; 425/515; 425/520;
 427/211; 427/294; 427/366; 427/379; 427/561;
 427/595
[58] Field of Search ............... 156/167, 285, 244.11,
 156/244.21, 244.24, 500, 543; 425/83.1, 113,
 114, 324.1, 327, 326.1, 371, 388, 504, 515, 520;
 264/175, 128, 571, 511, 135, 136, 257, 258;
 118/50, 101, 106, 122, 126, 410, 415, 419;
 427/294, 359, 375, 384, 54.1, 211, 295, 366, 379,
 561, 595

[56] References Cited

U.S. PATENT DOCUMENTS

| | | | |
|---|---|---|---|
| 2,644,779 | 7/1953 | Manning | 156/167 |
| 2,687,363 | 8/1954 | Manning | 156/167 |
| 2,750,317 | 6/1956 | Manning | 156/167 |
| 3,043,738 | 7/1962 | Demeter et al. | 264/511 |
| 3,126,580 | 3/1964 | Paschke | 264/511 |
| 3,142,599 | 7/1964 | Chavannes | 156/285 |
| 3,165,432 | 1/1965 | Plaskett | 156/285 |
| 3,190,781 | 6/1965 | Metz, Jr. | 156/244.21 |
| 3,399,096 | 8/1968 | Ranger | 156/244.21 |
| 3,418,198 | 12/1968 | Einstman | 156/285 |
| 3,421,964 | 1/1969 | Arbit | 156/244.21 |
| 3,470,055 | 9/1969 | Wade | 264/135 |
| 3,533,834 | 10/1970 | Marzocchi | 118/50 |
| 3,837,973 | 9/1974 | Asakura et al. | 425/388 |
| 3,959,059 | 5/1976 | Alexander et al. | 156/285 |
| 3,999,928 | 12/1976 | Asakura et al. | 425/388 |
| 4,123,211 | 10/1978 | Rudloff | 425/83.1 |
| 4,288,475 | 9/1981 | Meeker | 427/294 |
| 4,474,845 | 10/1984 | Hagermann et al. | 264/175 |
| 4,767,643 | 8/1988 | Westervelt et al. | 427/54.1 |
| 4,956,140 | 9/1990 | Rolles et al. | 264/175 |
| 5,028,361 | 7/1991 | Fujimoto | 264/175 |

FOREIGN PATENT DOCUMENTS

| | | |
|---|---|---|
| 0209713 | 1/1987 | European Pat. Off. |
| 3840704 | 7/1989 | Fed. Rep. of Germany |
| 2443325 | 7/1979 | France |
| 55-77525 | 6/1980 | Japan |
| 61-279518 | 12/1986 | Japan |
| 1100485 | 2/1965 | United Kingdom |

OTHER PUBLICATIONS

Patent Abstracts of Japan, vol. 12, No. 416 (M-759)(3263) Nov. 4, 1988 & JP-A-63 153 107 (Toshiba Chem Corp.) Jun. 25, 1988.

Primary Examiner—Jay H. Woo
Assistant Examiner—Robert B. Davis
Attorney, Agent, or Firm—Oblon, Spivak, McClelland, Maier & Neustadt

[57] ABSTRACT

An apparatus for and a method of manufacturing a fiber reinforced thermoplastic sheet-shaped molding including a pre-impregnating process and a final impregnating process. A sheet of thermoplastic resin and a web of reinforcement fibers are supplied through the pre-impregnating process during which the thermoplastic resin is sucked under the influence of a suction force so as to partially penetrate into interstices in the reinforcement fiber web while both are transported around and by a perforated rotary drum, thereby to form a first preformed sheet. The first preformed sheet is subsequently supplied to the final impregnating process during which an impregnating machine is employed. As the first preformed sheet is passed through the impregnating machine while compressed inwardly and heated, the thermoplastic resin is allowed to completely penetrate into the interstices in the reinforcement fiber web to complete the fiber reinforced thermoplastic sheet-shaped molding upon cooling thereof. The fiber reinforced thermoplastic sheet-shaped molding is made of thermoplastic resin impregnated with reinforcement fibers.

9 Claims, 11 Drawing Sheets

Example 3   Magnification Factor of 200

Example 6    Magnification Factor of 200

Comparison 1    Magnification Factor of 200

METHOD AND APPARATUS FOR MANUFACTURING A FIBER REINFORCED THERMOPLASTIC SHEET-SHAPED MOLDING BY USING SUCTION TO PARTIALLY IMPREGNATE A FIBER WEB

BACKGROUND OF THE INVENTION

1. Field of the Invention

The present invention generally relates to a fiber reinforced thermoplastic sheet-shaped molding which is made of reinforcement fibers impregnated with thermoplastic resin and which may be used as material for products of a type requiring a high resistance to heat and a high creep characteristic such as, for example, automobile component parts, component parts of electric appliances, daily commodities and so on.

The present invention also relates to a method of and an apparatus for manufacturing the fiber reinforced thermoplastic sheet-shaped molding of the kind referred to above.

2. Description of the Prior Art

The fiber reinforced thermoplastic sheet-shaped molding is not a recent development and has been used for many years in various products. As is well known to those skilled in the art, the fiber reinforced thermoplastic sheet-shaped molding is a thermoplastic sheet-shaped molding in which reinforcement fibers having a relatively large length are distributed to render it to exhibit an improved physical strength. Not only is the fiber reinforced synthetic resin used in numerous applications, the fiber reinforced thermoplastic resin is often used as an alternative to metal because of its high physical strength.

However, the prior art fiber reinforced thermoplastic sheet-shaped molding generally has a problem in that it has a high void content with voids being relatively large in size and is therefore relatively low in physical strength.

According to the prior art, the fiber reinforced thermoplastic sheet-shaped molding is manufactured by a number of methods. For example, the Japanese Laid-open Patent Publication No. 55-77525, published in 1980, (which is a Japanese counterpart of U.S. patent application Ser. No. 965,956 filed in 1978) discloses a method comprising steps of laminating a ply of reinforcement fibers and a ply of thermoplastic material one above the other, compressing the laminated plies together by the application of a pressure across the direction of thickness thereof while the plies are heated to cause the reinforcement fibers to be impregnated in the ply of thermoplastic material thereby to provide a fiber reinforced synthetic sheet, and cooling the resultant fiber reinforced thermoplastic sheet-shaped molding.

Another method known to those skilled in the art comprises steps of supplying thermoplastic resin in melt state between plies of reinforcement fibers to provide a resin layer of a sandwich structure, supplying thermoplastic sheets or films onto the layer of sandwich structure so as to form respective outermost layers, and passing the resultant layered structure through a belt-type impregnating machine, including a heating unit, a compressing unit and a cooling unit, thereby to cause the reinforcement fibers to be impregnated in the thermoplastic material.

The second mentioned method in which the belt-type impregnating machine is employed is available in two processes depending on the type of thermoplastic resin used. One of those processes employs, as the thermoplastic resin, polyester resin such as, for example, polyethylene terephthalate. An apparatus capable of practicing this process using the polyester resin is schematically illustrated in FIG. 14 of the accompanying drawings, reference to which will now be made for the detailed discussion thereof.

Referring to FIG. 14, a laminated web made up of sheets a of polyethylene terephthalate and a mat (b) of reinforcement fibers positioned intermediate between the polyethylene terephthalate (PET) sheets a is supplied in between a nipping region between upper and lower conveyor belts 1A and 1B made of heat-resistant metal and forming a belt-type impregnating machine 7. The upper and lower conveyor belts 1A and 1B are supported for movement in a direction of transport of the laminated web and in a direction close to each other so that pressure can be applied to the laminated web from opposite directions transverse to the laminated web.

The belt-type impregnating machine 7 also comprises a heating and compressing unit 4, which includes a plurality of heating rolls 3 adapted to be heated by respective heaters 2 and juxtaposed behind a feed run of each of the upper and lower conveyor belts 1A and 1B, and a cooling unit 6 positioned on one side downstream of the heating and compressing unit 4 with respect to the direction of transport of the laminated web (c) and including a plurality of cooling rolls 5 juxtaposed behind a feed run of each of the upper and lower conveyor belts 1A and 1B. Each of the cooling rolls 5 for each conveyor belt 1A and 1B is of a type having a longitudinal hollow through which a coolant such as, for example, water or oil, can flow in one direction.

This belt-type impregnating machine 7 is so designed and so operable that, during the transport of the laminated web, as indicated by (c), through the nipping region defined between the upper and lower conveyor belts 1A and 1B, the laminated web (c) can be compressed and heated by the heating and compressing unit 4 to melt the polyethylene terephthalate sheets (a) thereby to cause the latter to penetrate into interstices in the mat (b) of reinforcement fibers and is subsequently cooled by the cooling unit 6 while still compressed by the upper and lower conveyor belts 1A and 1B.

Although not shown, as a matter of practice, the upper and lower conveyor belts 1A and 1B are drivingly coupled with a common drive motor 8 through a train of gears so that the upper and lower conveyor belts 1A and 1B can run in respective directions opposite to each other at an equal speed to transport the laminated web (c) in a direction shown by the arrow x.

The other process employs the thermoplastic resin of a kind that requires no drying, examples of which include polyolephiline resin such as, for example, polypropylene or polymethyl pentene, or polyacethale resin or ABC resin. An apparatus capable of practicing this process using the thermoplastic resin of the kind which does not require any drying is schematically shown in FIG. 15 of the accompanying drawings, reference to which will now be made for the detailed discussion thereof.

Referring to FIG. 15, sheets (a) of thermoplastic resin and mats (b) of reinforcement fibers are supplied from rolls in alternating fashion with each other to form a continuous laminated web (c) which is subsequently transported into the nipping region defined in a belt-type impregnating machine of a type substantially identical with that shown in FIG. 15 for the manufacture of a continuous fiber reinforced thermoplastic sheet-shaped molding. This machine is disclosed in, for example, the Japanese Laid-open Patent Publication No. 61-279518, published in 1986.

However, the prior art fiber reinforced thermoplastic sheet-shaped molding has a relatively high void content with voids relatively large in size and has consequently a reduced physical strength.

According to the prior art methods of manufacturing the fiber reinforced thermoplastic sheet-shaped molding with the use of the belt-type impregnating machines 7, because the heating of the laminated web (c) containing the thermoplastic resin sheets (a) and the reinforcement fiber mats (b) is initiated substantially simultaneously with the application of the pressure thereto in a direction inwardly across the thickness thereof after it has been supplied into the nipping region in the impregnating machine 7 and, also, because the heating rolls 3 forming the heating and compressing unit 4 play an important role in heating the laminated web (c), a relatively long time is required for the laminated web (c) to be heated to an extent that the thermoplastic resin in melt state can penetrate sufficiently into interstices in the reinforcement fiber mats (b), constituting a cause of reduction in productivity of the intended fiber reinforced thermoplastic sheet-shaped molding. Also, the heating of the laminated web (c) for a substantially prolonged time can result in a thermal deterioration such as, for example, thermal decomposition to such an extent that the fiber reinforced thermoplastic sheet-shaped molding can no longer exhibit a satisfactory performance.

Furthermore, since the impregnation of the melted thermoplastic resin into the interstices in the reinforcement fiber mats (b) is carried out by the application of pressure thereto by means of the rolls 3 compressing it from opposite directions, it often occurs that the reinforcement fibers tend to displace in position under the influence of applied physical pressures and/or an uneven penetration of the melted thermoplastic resin into the interstices in the reinforcement fiber mats (b) tends to take place when the melted thermoplastic resin receives an instantaneous application of the physical pressures, that is, a localized pressure. These may constitute a cause of reduction in quality of the resultant fiber reinforced thermoplastic sheet-shaped molding.

SUMMARY OF THE INVENTION

In view of the foregoing problems inherent in the prior art fiber reinforced thermoplastic sheet-shaped moldings and the prior art method for the manufacture thereof, the present invention is intended to provide an improved fiber reinforced thermoplastic sheet-shaped molding which exhibits a reduced void content with voids being small in size.

Another object of the present invention is to provide an improved apparatus for and an improved method of manufacturing the fiber reinforced thermoplastic sheet-shaped molding of the kind referred to above, which can be manufactured in a minimized length of time and at a relatively high productivity, ensuring a relatively high performance of a product that is eventually made with the use of such fiber reinforced thermoplastic sheet-shaped molding.

A further object of the present invention is to provide an improved method of and an improved apparatus for manufacturing an improved fiber reinforced thermoplastic sheet-shaped molding of the type referred to above, wherein the thermoplastic resin can be satisfactorily and effectively impregnated in the interstices in the reinforcement fibers even though the thermoplastic synthetic resin used exhibits a relatively high viscosity in melt state.

To this end, the present invention according to one aspect thereof provides a fiber reinforced thermoplastic sheet-shaped molding having a void content not higher than 1% and also having voids of a size not greater than 100 $\mu$m, preferably not greater than 50 $\mu$m. Where polyester resin is employed for a thermoplastic resin, the viscosity retentivity which provides an index of thermal deterioration of the resin is not lower than 80%, preferably higher than 85%. The fiber reinforced thermoplastic sheet-shaped molding according to the present invention has a tensile strength of not lower than 13.5 kg/mm$^2$, preferably higher than 15 kg/mm$^2$.

On the other hand, where polyolefine resin is employed for the thermoplastic resin, the retentivity of the melt index indicative of the degree of thermal deterioration of the resin is not lower than 75%, preferably higher than 80% and the fiber reinforced thermoplastic sheet-shaped molding exhibits a tensile strength of not lower than 10 kg/mm$^2$.

The fiber reinforced thermoplastic sheet-shaped molding does not substantially contain voids and, even if it contains, the void content is extremely low with relatively small voids and, therefore, the fiber reinforced thermoplastic sheet-shaped molding according to the present invention is excellent in respect of strength.

According to another aspect of the present invention a method for manufacturing the fiber reinforced thermoplastic sheet-shaped molding of the type referred to above comprises applying a sheet of thermoplastic resin to a web of reinforcement fibers so as to cover one surface of the reinforcement fiber web; sucking the thermoplastic resin sheet through the reinforcement fiber web to cause thermoplastic resin to penetrate into interstices in the reinforcement fiber web thereby to form a first preformed sheet; and while the first preformed sheet is compressed in a direction across a thickness thereof, heating the first preformed sheet to cause the thermoplastic resin to penetrate substantially completely into the interstices in the reinforcement fiber mat thereby completing the fiber reinforced thermoplastic sheet-shaped molding. In other words, the first preformed sheet is formed by pre-impregnating the reinforcement fiber web with thermoplastic resin while sucking the latter so as to penetrate into interstices in the reinforcement fiber web.

The pre-impregnation, that is, the preliminary impregnation, is quickly performed by the utilization of a suction force and, therefore, the total length of time required to complete the impregnation including the length of time required to accomplish this pre-impregnation can be advantageously reduced as compared with that in the prior art methods in which no pre-impregnation is performed.

Also, the pre-impregnation effected by the use of the suction force to accomplish a partial penetration of the thermoplastic resin into the interstices in the reinforcement fiber web is effective to allow the thermoplastic resin to penetrate effectively and satisfactorily into the interstices in the reinforcement fiber web with no need to apply a pressure necessary to fluidize the thermoplastic resin. Therefore, any possible uneven penetration of the thermoplastic resin into the interstices in the reinforcement fiber web can be advantageously minimized.

According to a further aspect of the present invention, there is provided a method of manufacturing a fiber reinforced thermoplastic sheet-shaped molding which comprises applying a sheet of thermoplastic resin to an upper surface of a web of reinforcement fibers so as to cover the upper surface of the reinforcement fiber web; sucking the thermoplastic resin sheet through the reinforcement fiber web to cause thermoplastic resin to penetrate into interstices in the reinforcement fiber web thereby to form a first preformed sheet; reversing the first preformed sheet to cause the reinforcement fiber web to lie above the thermoplastic resin sheet; and while the first preformed sheet is compressed in a direction across a thickness thereof, heating the first preformed sheet to cause the thermoplastic resin to penetrate substantially completely into the interstices in the reinforcement fiber mat thereby completing the fiber reinforced thermoplastic sheet-shaped molding.

This alternative method according to the present invention is advantageous in that, not only can the total length of time required to complete the impregnation be reduced as discussed above, but also the reinforcement fibers will not fall and/or scatter by gravity even though binder particles used to interlock the fibers are melted under the influence of heat applied during the pre-impregnation because the laminated layer is reversed in position so that the reinforcement fiber web comes atop the thermoplastic resin sheet during the transportation thereof around the rotary drum.

In the practice of any one of those methods of the present invention, it is preferred that a second sheet containing at least thermoplastic resin be applied to the reinforcement fiber web of the first preformed sheet subsequent to the formation of the first preformed sheet by the pre-impregnation and before the thermoplastic resin is caused to penetrate completely into the interstices in the reinforcement fiber web. The application of this second sheet is advantageous in that the amount of thermoplastic resin impregnated into the interstices in the reinforcement fiber web is increased and, accordingly, napping of reinforcement fibers exposed outwardly from surfaces of the resultant fiber reinforced thermoplastic sheet-shaped molding can be advantageously minimized.

According to a still further aspect of the present invention, there is provided an apparatus for manufacturing the fiber reinforced thermoplastic sheet-shaped molding of the type referred to above. This apparatus comprises a first supply unit for supplying continuously a sheet of thermoplastic resin and a web of reinforcement fibers to provide a laminated layer having the thermoplastic resin sheet positioned above the reinforcement fiber web; a pre-impregnating device including a rotary drum transport mechanism; and a final impregnating device operable to transport the first preformed sheet in one direction away from the rotary drum transport mechanism while applying a compressive force thereto in a direction transverse to the first preformed sheet and also operable to heat the first preformed sheet to cause the thermoplastic resin to penetrate substantially completely into the interstices in the reinforcement fiber web.

The rotary drum transport mechanism in the pre-impregnating device includes a rotary drum supported for rotation in one direction for transporting the laminated layer while turning the laminated layer upside down as it is transported during a rotation of the rotary drum so that the laminated layer separates away from the rotary drum from a position generally beneath the rotary drum. The pre-impregnating device further includes a heating means for heating the laminated layer; and a suction means for developing a sucking force inside the rotary drum to suck the laminated layer close to the rotary drum with the reinforcement fiber web held in direct contact with an outer peripheral surface of the rotary drum during the transportation of the laminated layer around the rotary drum to cause thermoplastic resin to partially penetrate into interstices in the reinforcement fiber web thereby to form a first preformed sheet.

Preferably, the apparatus may further comprise a second supply unit for supplying a second sheet containing at least thermoplastic resin onto an upper surface of the first preformed sheet before the first preformed sheet is transported to the final impregnating device.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views, and:

DETAILED DESCRIPTION OF THE EMBODIMENTS

Figure 1:
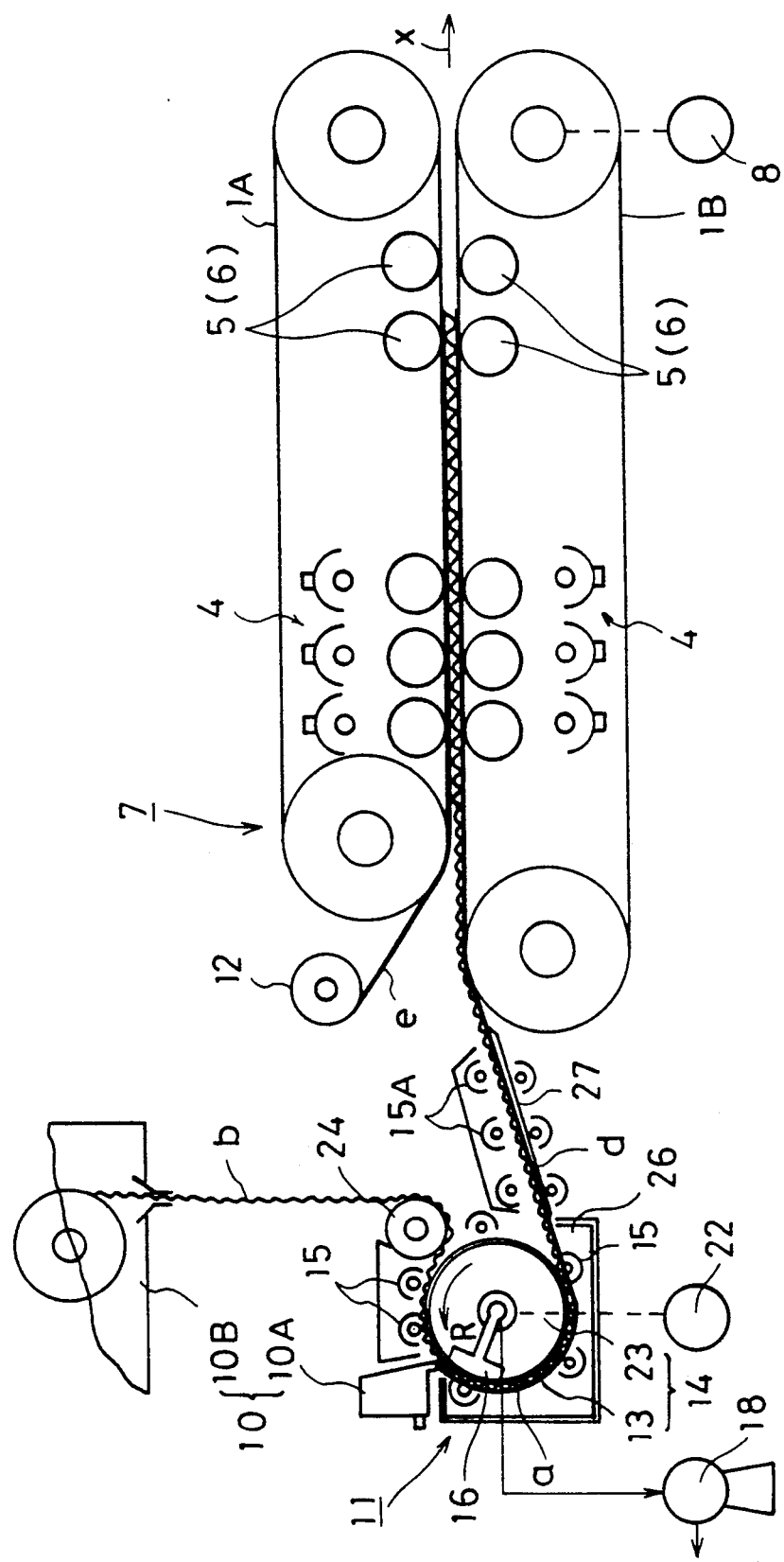
FIG. 1 is a schematic sectional side view of a manufacturing apparatus according to a first preferred embodiment of the present invention.

According to a method of manufacturing a fiber reinforced thermoplastic sheet-shaped molding according to the present invention, a thermoplastic resin in a melt state or in the form of a film is applied to one surface of a web of reinforcement fibers. Thereafter, a sucking force is applied through interstices in the reinforcement fiber web to draw the thermoplastic resin close towards the reinforcement fiber web so that the thermoplastic resin can penetrate partially into the interstices in the reinforcement fiber web to accomplish a pre-impregnation, i.e., a preliminary impregnation. By this pre-impregnation, a laminated layer (a first preformed sheet) of a structure in which the thermoplastic resin has penetrated partially into the interstices in the reinforcement fiber web can be obtained.

The application of the thermoplastic resin sheet to one surface of the reinforcement fiber web to form a laminated layer may be carried out by, for example, laminating a sheet or film of thermoplastic resin on one surface of the reinforcement fiber web, followed by the heating to melt or soften the thermoplastic resin. Alternatively, it may be carried out by supplying a melt or softened state of thermoplastic resin onto one surface of the reinforcement fiber web through a die connected extruder. Again alternatively, it may be carried out by supplying the thermoplastic resin uniformly over one surface of the reinforcement fiber web at a predetermined rate.

The laminated layer formed in the manner described above is subsequently guided to a guide roll assembly having a suction region where the laminated layer is sucked by the effect of a suction force, so that, from a side of the reinforcement fiber web forming a part of the laminated layer, the applied thermoplastic resin sheet is sucked close to the reinforcement fiber web by the application of the sucking force of 50 to 700 Torr, preferably 100 to 600 Torr, to allow the thermoplastic resin to penetrate into interstices in the reinforcement fiber web, i.e., to allow the reinforcement fiber web to be impregnated with the thermoplastic resin thereby to complete a preformed resinous layer.

In the practice of the present invention, the size and the number of openings through which the suction force is applied to draw the thermoplastic resin sheet close towards the reinforcement fiber web at a sucking region of the apparatus are not limited provided that the degree of impregnation referred to above can attain a value not lower than 30%, preferably not lower than 50%. Although the highest degree of impregnation is not limited.

The number of the openings through which the suction force is applied at the sucking region of the apparatus is preferred to be two or more in order for the thermoplastic resin to be uniformly penetrated into the interstices in the reinforcement fiber web.

Also, in order to avoid a possible cooling of the thermoplastic resin during the impregnation, the suction region referred to above is preferably provided with a heating device such as, for example, a far-infrared radiating heater. The temperature to which the heating device gives may not be limited provided that it is sufficient to melt or soften the thermoplastic resin to assume a fluidized state. Again, in order to avoid a possible thermal deterioration of the thermoplastic resin, the length of time during which the pre-impregnation is carried out is controlled preferably to 5 to 120 seconds, more preferably 10 to 60 seconds.

The type of the guide roll assembly is not limited, but may be preferably employed in the form of a mesh guide or a punched metal guide in order to facilitate the impregnation of the reinforcement fiber web with the thermoplastic resin. Where the mesh guide is employed, the mesh guide is preferred to have perforations of 10 to 300 meshes in size to minimize the resistance counteracting the suction force and also to avoid fall of reinforcement fibers through the perforations in the mesh guide. On the other hand, where the punched metal guide is employed, the average size and the number of perforations per unit area defined in the punched metal guide should be properly determined in consideration of a condition similar to that discussed above in connection with the meshes in the mesh guide.

The roll guide assembly may be applied with a separation assisting agent or may have its surface treated with a separation assisting agent such as ceramics or polytetrafluoroethylene coating.

The preformed resinous layer in which the thermoplastic resin has penetrated into the interstices in the reinforcement fiber web to a certain extent is, after the pre-impregnation process described above, guided to a belt-type impregnating machine which may be of a type similar to the prior art belt-type impregnating machine. As hereinbefore discussed in connection with the prior art, the belt-type impregnating machine is of a construction wherein, for example, two substantially endless flat belts are drivingly trained between spaced apart rolls, respectively, and positioned one above the other to define a nipping region therebetween, which nipping region extends in one direction from a receiving end to a delivery end. The belt-type impregnating machine has a heating and compressing region defined adjacent the receiving end and a cooling region defined on one side of the heating and compressing region adjacent the delivery end. The heating and compressing region is heated to a temperature sufficient to cause the thermoplastic resin to melt or soften to fluidize, the maximum heating temperature being chosen to be of a value at which the thermoplastic resin can be thermally decomposed.

In the practice of the present invention, during the transport of the preformed resinous layer through the heating and compressing region between the belts, the thermoplastic resin is melted or softened to fluidize and, at the same time, compressed by means of compressing rolls so that pores and voids formed in the interstices in the reinforcement fiber web can be substantially completely removed.

If at this time the amount of the thermoplastic resin is small, it may occur that reinforcement fibers in the reinforcement fiber web may fluff out from surfaces of the resultant fiber reinforced thermoplastic sheet-shaped molding. Accordingly, in order to avoid this possibility, substantially simultaneously with the introduction of the laminated layer into the nipping region through the receiving end, it is preferred either to supply a sheet or film of thermoplastic resin identical with that used in the preformed resinous layer so as to cover one of the surfaces of the preformed resinous layer opposite to the surface where the thermoplastic resin has been impregnated during the pre-impregnation process, or to supply the identical thermoplastic resin through a die connected extruder in melt or softened state so as to cover one of the surfaces of the preformed resinous layer opposite to the surface where the thermoplastic resin has been impregnated during the pre-impregnation process. It is, however, to be noted that, instead of the additional sheet or film of the thermoplastic resin, a laminated layer comprising a similar thermoplastic resin sheet and a similar reinforcement fiber web may be additionally employed.

The cooling region in the belt-type impregnating machine is kept at a temperature lower than the transition point of glass or a melting point of glass. Because of this low temperature, the thermoplastic resin melted or softened during the passage through the heating and compressing region can be cooled to solidify. Where crystalline thermoplastic resin is employed, it may have any point of crystallization.

The resultant fiber reinforced thermoplastic sheet-shaped molding can be delivered out from the delivery end of the belt-type impregnating machine by means of a drawing roll assembly. The resultant fiber reinforced thermoplastic sheet-shaped molding emerging from the belt-type impregnating machine may be transferred to a subsequent molding station for the production of molded products or may be cut to a required or desired size for the storage.

This laminated layer is subsequently compressed by the application of a pressure from opposite directions transverse to the laminated layer, i.e., across the thickness of the laminated layer, and is, while kept in a compressed state, heated to allow the thermoplastic resin to penetrate completely or substantially completely into the interstices in the reinforcement fiber web, thereby completing the intended fiber reinforced thermoplastic sheet-shaped molding. The compression of the laminated layer and the final impregnation of the thermoplastic resin into the interstices in the reinforcement fiber web may be carried out with the use of any known prior art impregnating apparatus.

The reinforcement fibers which can be employed in the practice of the method of the present invention may be fibers of inorganic compound such as, for example, glass fibers, carbon fibers, metal fibers or ceramic fibers; fibers of organic compound such as, for example, polyvinyl alcohol fibers, polyarylate fibers or aramide fibers; or various whiskers. Those fibers may be employed singly or in combination. Considering the heat resistant property desired for the resultant fiber reinforced thermoplastic sheet-shaped molding to have, the use of the fibers of inorganic compound such as the glass fibers, the carbon fibers, the metal fibers or the ceramic fibers is preferred. Of them, the glass fibers are inexpensive to use.

The reinforcement fibers may have their surfaces treated with an adhesion promoting agent such as, for example, a silane coupling agent, to facilitate the adhesion of the thermoplastic resin to the reinforcement fibers.

The reinforcement fibers forming the reinforcement fiber web used in the practice of the present invention may have any suitable length and size or diameter. However, the use of the reinforcement fibers are preferred to have an average length of 5 mm or greater, preferably 10 mm or greater, and an average fiber diameter within the range of 2 to 50 $\mu$m in view of a ready availability.

The reinforcement fiber web used in the practice of the present invention may be in the form of a textile fabric such as, for example, a plain woven fabric, a satin woven fabric or a twilled fabric; a knitted fabric, fibers laid down in one direction, a chopped strand mat, a continuance strand mat, a filament mat, a mat having the fibers bound together by means of a binder, or a mat of reinforcement fibers entwined by, for example, needling, or a combination of two or more of them. Those mats may be employed singly or in combination.

The reinforcement fiber web used in the practice of the present invention may contain fibrous material such as, for example, staple glass fibers; a flaky filler material such as, for example, talc, mica or glass flakes; a granular filler material such as, for example, glass beads, glass microbaloon or calcium carbonate; or a needle-shaped filler material such as, for example, Wallastonite.

On the other hand, preferred examples of the thermoplastic resin which can be advantageously used in the practice of the present invention include polyester resin such as, for example, polyethylene terephthalate or polybutylene terephthalate; polyamide resin such as, for example, nylon-6, nylon-66 or nylon-12; polycarbonate resin, polyolefine resin such as, for example, polyethylene, polypropylene or polymethyl pentene; polyacetal resin; ABS resin; polystylene resin; or other synthetic resins such as, for example, polyvinyl chloride, polyvinylidene chloride, styrene-butadiene-acrylonitrile copolymer, styrene-acrylonitrile copolymer, polysulfone, polyacetale, polymethyl methacrylate, polyarylate, polyether ether ketone, polyphenylen oxide or thermoplastic polyurethane.

Where the resultant fiber reinforced thermoplastic sheet-shaped molding according to the present invention is desired to have a relatively high resistance to heat and also an improved creep characteristic, the use of polyester resin, polyamide resin or polyolefine resin is preferred. Of them, polyethylene terephthalate is more preferred. Those resins may be modified and may be employed singly or in combination.

Also, for the purpose of enhancing other characteristics, the thermoplastic resin used in the practice of the present invention may have added to one or a mixture of additives such as, for example, oxidization preventing agent, flame retardant, hydrolysis retardant, ultraviolet absorbent, coloring agent, crystallizing agent, internal releasing agent, lubricant and a filler material such as, for example, flaky, granular or needle-shaped filler.

Hereinafter, an apparatus for manufacturing the above discussed fiber reinforced thermoplastic sheet-shaped molding will be discussed.

Referring first to FIG. 1, there is shown an apparatus for manufacturing the fiber reinforced thermoplastic sheet-shaped molding according to a first preferred embodiment of the present invention. The apparatus shown therein comprises a first supply unit 10 of a structure designed to continuously supply the thermoplastic resin sheet (a) and the reinforcement fiber web (b) with the latter positioned beneath the former; a pre-impregnating device 11 of a structure designed to transport a laminated layer, including the thermoplastic resin sheet (a) and the reinforcement fiber web (b), by means of a rotatably supported transport drum assembly while heating the laminated layer from opposite directions of the laminated layer across the thickness thereof to a temperature sufficient to cause the thermoplastic resin to melt or soften and also to apply a suction force from the side of the reinforcement fiber web (b) to cause the thermoplastic resin forming the sheet (a) in the melt or softened state to partially penetrate into interstices in the reinforcement fiber web (b) thereby to form a preformed resinous layer (a first preformed sheet) (d); a second supply unit 12 for supplying a second sheet (e) of thermoplastic resin onto the preformed resinous layer (d), formed by the pre-impregnating device 11, so as to cover an upper surface of the preformed resinous layer (d) thereby to provide a three-ply resinous layer; a roll-type impregnating machine 7 of a structure designed to have a nipping region through which the three-ply resinous layer is transported and also to heat and compact the three-ply resinous layer in a direction across the thickness thereof to a temperature effective to cause the thermoplastic resin to melt or soften enough to penetrate into portion of the interstices in the reinforcement fiber web (b) which has not yet been impregnated with the thermoplastic resin, thereby to complete the fiber reinforced thermoplastic sheet-shaped molding.

The first supply unit 10 referred to above comprises a polymer extruder 10A (In FIG. 1, only a die of the extruder is shown.) from which thermoplastic resin in melt or softened state is continuously extruded in the form of a sheet (a) of thermoplastic resin and a mat supply assembly 10B positioned laterally above the plastics extruder 10A for continuously supplying a web (b) of reinforcement fibers downwardly from a roll forming a part of the mat supply assembly 10B.

Figure 2:
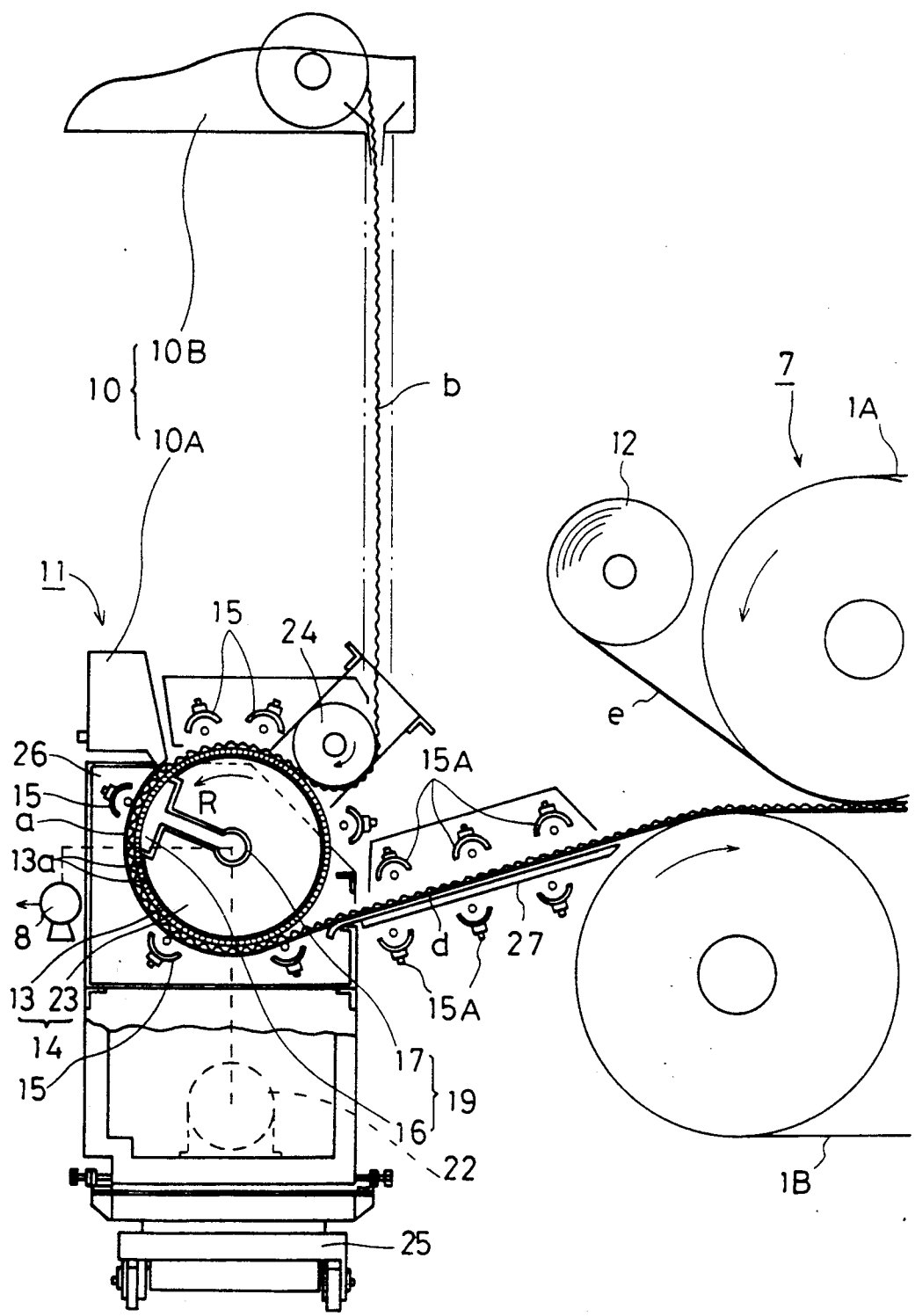
FIG. 2 is a schematic side sectional view, on an enlarged scale, of a pre-impregnating unit used in the manufacturing apparatus shown in FIG. 1.

The pre-impregnating device 11 referred to above comprises, as best shown in FIG. 2 on an enlarged scale, a double drum assembly 14 including a generally cylindrical rotary drum 13 (which may be referred to as a roll-shaped guide) and a similarly cylindrical fixed drum 23 within which the rotary drum 13 is rotatably supported in coaxial relationship therewith. The rotary drum 13 is drivingly coupled with a drive motor 22 for rotation in one direction shown by the arrow R and has a peripheral wall formed with a multiplicity of suction perforations 13a defined therein in a predetermined pattern so as to extend radially across the thickness of the peripheral wall. If desired or required, an outer peripheral surface of the perforated peripheral wall of the rotary drum 13 may be protected with a mesh or a punched sheet member. The double drum assembly 14 including the rotary drum 13 supported inside the fixed drum 23 is so designed that, during the rotation of the rotary drum 13, the reinforcement fiber web (b), which is continuously supplied from the mat supply assembly 10B through a drive roll 24 to a first supply point defined adjacent the drive roll 24 and diagonally upwardly of the double drum assembly 14 on a right-hand side as viewed in FIG. 2, and the thermoplastic resin sheet (a) extruded from the extruder 10A so as to overlay the reinforcement fiber web (b) at a point diagonally upwardly of the double drum assembly 14 on a left-hand side as viewed in FIG. 2 can be transported therearound towards a separating point defined generally at the bottom of the double drum assembly 14. During the transportation of the laminated layer around and by means of the rotary drum 13 during the rotation of the latter, a suction force is introduced into the hollow of the fixed drum 23 to draw the thermoplastic resin sheet (a) close towards the rotary drum 13 to cause the thermoplastic resin to penetrate partly into the interstices in the reinforcement fiber web (b) to complete the pre-impregnation.

It will readily be seen that, when the laminated layer including the thermoplastic resin sheet (a) and the reinforcement fiber layer (b) has been transported to the separating point, the thermoplastic resin sheet (a) supplied so as to overlay the reinforcement fiber web (b) and, hence, positioned above the reinforcement fiber web (b), is reversed to assume a position beneath the reinforcement fiber web (b).

The pre-impregnating device 11 also comprises an electric heater assembly 15 employed preferably in the form of, for example, a far-infrared radiating heater, and a suction unit 19 for sucking the thermoplastic resin sheet (a) through the interstices in the reinforcement fiber web (b) in a manner as will be described in more detail. The electric heater 15 is disposed in the vicinity of and radially outwardly of the double drum assembly 14, specifically the rotary drum 13, for heating the laminated layer including the thermoplastic resin sheet (a) and the reinforcement fiber web (b) that is supplied and transported around and by means of the rotary drum 13.

The suction unit 19 comprises a suction box 16 supported by and inside the fixed drum 23 and having an opening positioned radially inwardly of and open radially outwardly to the rotary drum 13 through the perforations 13a in the peripheral wall of the rotary drum 13, and a vacuum pump 18 communicated with the interior of the suction box 16 through a suction piping 17 having one end fluid-connected with a bottom of the suction box 16 and the other end communicated with the vacuum pump 18. This suction unit 19 is so designed and so operable that, during the transportation of the laminated layer by and around the rotary drum 13 towards the separating point, the thermoplastic resin sheet (a) heated by the electric heater 15 to a temperature effective to melt or soften the thermoplastic resin to fluidize can be sucked by the suction force, introduced through the perforations 13a in the outer peripheral wall of the rotary drum 13 and then through the interstices in the reinforcement fiber web (b) so as to penetrate into the interstices in the reinforcement fiber web (b) thereby to form a preformed resinous layer d.

Figure 3:
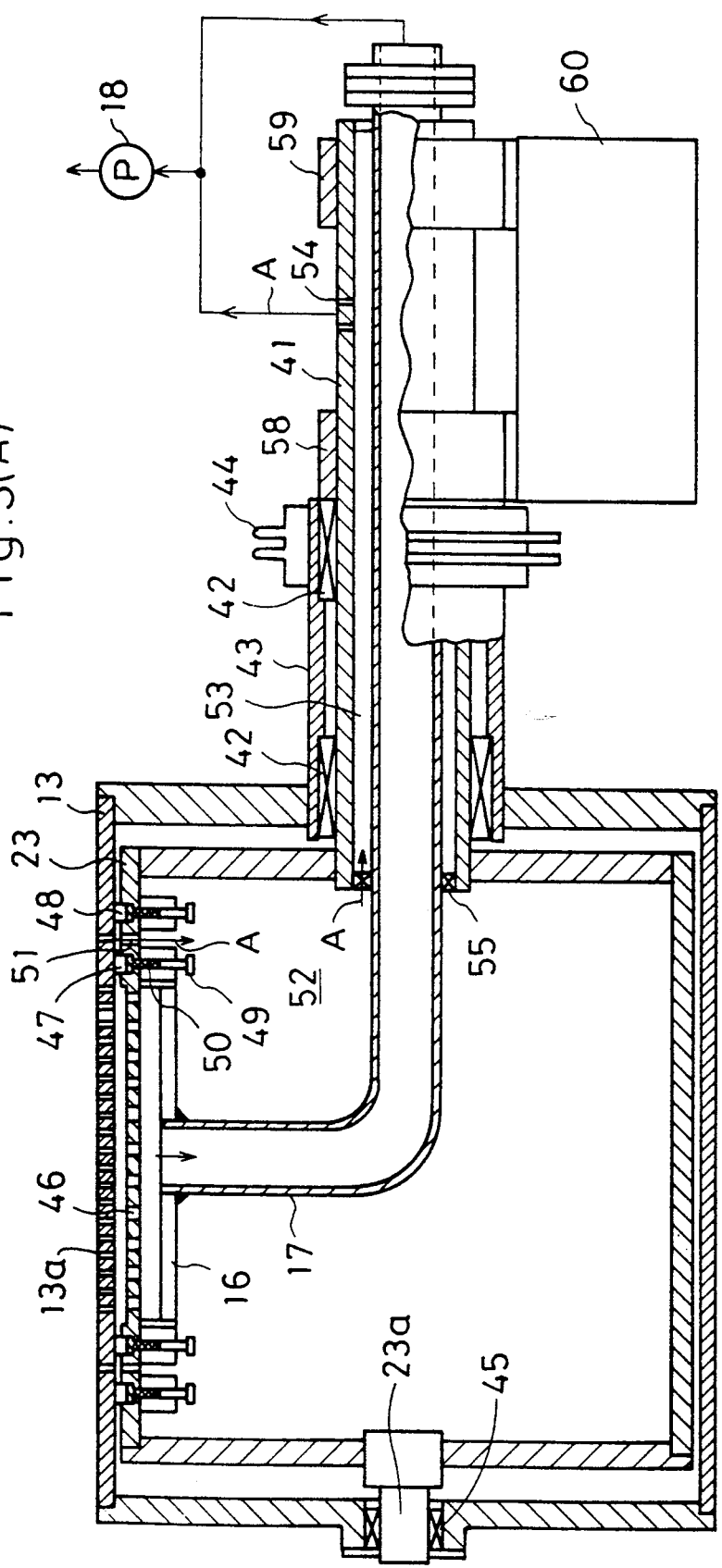
FIG. 3A is a side sectional view, on a further enlarged scale, of a pre-impregnating drum mechanism used in the pre-impregnating unit shown in FIG. 2.
FIG. 3B is a cross-sectional view of a suction pipe being supported and retained in a fixed quill shaft by a spacer ring.

The details of the double drum assembly 14 are best shown in FIG. 3. Referring to FIG. 3(A), a cylindrical rotary shaft 43 is rotatably mounted exteriorly on a fixed quill shaft 41 through a bearing assembly 42 in coaxial relationship therewith. The cylindrical rotary shaft 43 has a sprocket 44 mounted exteriorly thereon for rotation together therewith, the sprocket 44 being drivingly coupled with the motor 22 (FIG. 2) through a mesh belt or a chain belt (not shown) so that the rotary shaft 43 can be driven in one direction by the motor 22 about the longitudinal axis thereof relative to the fixed quill shaft 41. The rotary shaft 43 has one end rigidly coupled with one of opposite end walls (a right-hand end wall as viewed in FIG. 3(A)) of the rotary drum 13 so that the rotation of the rotary shaft 43 can result in a corresponding rotation of the rotary drum 13.

The fixed quill shaft 41 has one end rigidly coupled with one of opposite end walls (a right-hand end wall as viewed in FIG. 3(A)) of the fixed drum 23 positioned inside the rotary drum 13 in coaxial relationship therewith while the other of the opposite end walls, that is, a left-hand end wall, of the fixed drum 23 remote from the fixed quill shaft 41 is formed with a stud shaft 23a coaxial with the fixed quill shaft 41 and journalled to a bearing 45 formed in the other of the opposite end walls, that is, a left-hand end wall, of the rotary drum 13 for rotation independently of the rotary drum 13.

The fixed drum 23 has only a perforated portion of its peripheral wall formed with a plurality of through-holes 46. The suction box 16 fixedly supported inside the fixed drum 23 has its opening aligned with the perforated portion of the peripheral wall of the fixed drum 23, the interior of the suction box 16 being communicated with the suction piping 17 which extends therefrom through the fixed quill shaft 41 for fluid connection with the vacuum pump 18. Accordingly, it will readily be understood that, during the operation of the vacuum pump 18, the suction force can be developed within the suction box 16 for drawing close towards the rotary drum 13 the laminated layer then transported around and in contact with the rotary drum 13.

The suction box 16 referred to above is of a generally rectangular flattened box-shaped configuration having the generally rectangular opening communicated with the perforated portion of the outer peripheral wall of the fixed drum 23. A peripheral lip of the suction box 16 adjacent the rectangular opening thereof has double sealings 47 and 48 mounted thereon and held in sliding contact with an inner peripheral surface of the peripheral wall of the rotary drum 13 so as to encompass the rectangular opening of the suction box 16, each of the double sealings 47 and 48 being employed in the form of, for example, a carbon sealing. Those sealings 47 and 48 are normally biased by respective biasing springs 50 so as to slidingly contact the inner peripheral surface of the peripheral wall of the rotary drum 13, a biasing force of each of the biasing springs 50 being adjustable by means of a respective adjustment screw 49. With the double sealings 47 and 48 held resiliently in contact with the inner peripheral surface of the peripheral wall of the rotary drum 13, any possible leakage of the suction force through a gap between the peripheral wall of the fixed drum 23 and that of the rotary drum 13 can be advantageously avoided.

A portion of the peripheral wall of the fixed drum 23 delimited between the double sealings 47 and 48 is formed with suction holes 51 defined therein in communication with an interior hollow 52 of the fixed drum 23. The interior hollow 52 of the fixed drum 23 is in turn communicated with the vacuum pump 18 through an annular passage 53 defined between the suction piping 17 and the fixed quill shaft 41 and then through a radially extending port 54 defined in the wall of the fixed quill shaft 41.

A portion of the suction piping 17 extending coaxially through the fixed quill shaft 41 is supported and retained in position by a spacer ring 55. As best shown in FIG. 3(B), the spacer ring 55 has a plurality of, for example, three, circumferentially spaced passages 56 to establish a fluid circuit from the interior hollow 52 of the fixed drum 23 to the suction pump 18 through the annular passage 53 between the fixed quill shaft 41 and that portion of the suction piping 17.

Thus, during the operation of the vacuum pump 18 to reduce the pressure inside the suction box 16, air outside the suction box 16 can be sucked and discharged to the outside through the suction holes 51, the interior hollow 52 and the annular passage 53, as indicated by the arrow A, and therefore, any possible leakage of an external air into the suction box 16, that is, air other than that introduced through the suction through-holes 46 in the peripheral wall of the fixed drum 13, can be effectively avoided.

The fixed quill shaft 41 is fixedly supported on a support structure 60 by means of spaced apart brackets 58,59.

Figure 4:
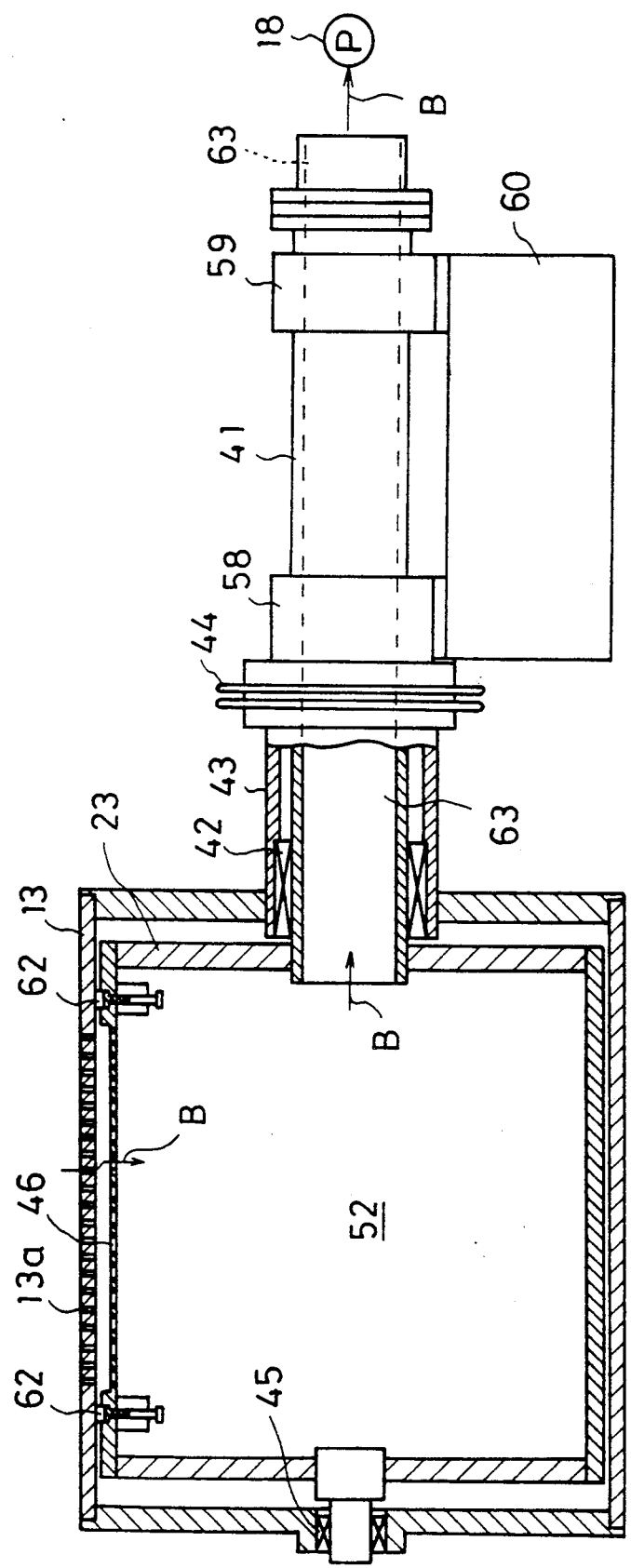
FIG. 4 is a schematic side sectional view showing a modified form of the pre-impregnating drum mechanism.

It is to be noted that, although reference has been made to the use of the double sealings 47 and 48 for each end of the fixed drum 23, a single sealing may be employed as shown by 62 in FIG. 4 and may be positioned on a side portion of the peripheral wall of the fixed drum 23 so as to surround the perforated portion where the through-holes 46 are defined.

It is also to be noted that the use of the suction box 16 is not always essential in the practice of the present invention and may be omitted as shown in FIG. 4. According to the modification shown in FIG. 4, the suction box is not employed and, therefore, the interior hollow 52 inside the fixed drum 23 is communicated with the vacuum pump 18 directly through the fixed quill shaft 41. In the modification shown in FIG. 4, the single sealing 62 is carried by the fixed drum 23, not by an outer peripheral lip of the suction box such as in the arrangement shown in FIG. 3(A), so as to encompass the perforated portion of the peripheral wall of the fixed drum 23 and, therefore, air outside the double drum assembly 14 can be sucked and discharged to the outside through the suction perforation 13a in the peripheral wall of the rotary drum 13, the through holes 46 in the peripheral wall of the fixed drum 23, the interior space 52 in the fixed drum 23 and the annular passage 63 defined between the fixed quill shaft 41 and the suction piping 17.

It is again to be noted that, in the illustrated embodiment, the opening of the suction box 16 is so synchronized with a speed of rotation of the rotary drum 13 that a length of time during which suction takes place can be within the range of 10 to 60 seconds and is so controlled that the degree of pre-impregnation attained by the pre-impregnating device 11 shown in FIG. 2 can be of a value not lower than 30%. The pre-impregnating device 11 shown in FIG. 2 may be supported either movably on a wheeled carriage 25 or fixedly on a plant floor. The double drum assembly 14 and the electric heater 15 both forming respective parts of the pre-impregnating device 11 are housed within a furnace housing 26 as shown in FIG. 2.

The second supply unit 12 comprises a drawing roll assembly operable to supply the second sheet e of thermoplastic resin, which has been formed by an extruder (not shown) and is continuously rolled down from a roll thereof onto the preformed resinous layer d, formed by the pre-impregnating device 11, so as to cover an upper surface of the preformed resinous layer d thereby to provide a three-ply resinous layer, as best shown in FIGS. 1 and 2. It is to be noted that, although reference has been made to the use of the electric heater 15 in the pre-impregnating device 11, any suitable heating means such as, for example, a high frequency heating device or a hot-air supply system, may be employed.

The roll-type impregnating machine 7 may be of a construction substantially similar to or identical with the prior art impregnating machine and comprises upper and lower heat-resistant metallic conveyor belts 1A and 1B each being made of, for example, stainless steel. The conveyor belts 1A and 1B are positioned one above the other so as to define a nipping passage therebetween and are operable to apply a compressing pressure to the three-ply resinous layer from opposite directions during the transportation of the three-ply resinous layer through the nipping passage to perform a final impregnating process subject to the three-ply resinous layer. As will become clear from the subsequent description, during the transportation of the three-ply resinous layer through the nipping passage between the upper and lower conveyor belts 1A and 1B, the three-ply resinous layer is transformed into the single fiber reinforced thermoplastic sheet-shaped molding as a result of the final impregnation by which the thermoplastic resins are substantially completely penetrated into the interstices in the reinforcement fiber web.

A transit over which the preformed resinous layer d is transported from the pre-impregnating device 11 onto the belt-type impregnating machine 7 may be provided with a transport guide plate 27 in combination with upper and lower rows of electric heaters 15A as shown in FIGS. 1 and 2.

The apparatus for manufacturing the fiber reinforced thermoplastic sheet-shaped molding according to the present invention shown in and described with reference to FIGS. 1 to 3 operates in the following manner.

The thermoplastic resin sheet (a) extruded from the plastics extruder 10A of the first supply unit 10 and the reinforcement fiber web (b) continuously supplied from the mat supply assembly 10B are supplied continuously onto the rotary drum 13 of the double drum assembly 14 from above with the thermoplastic resin sheet (a) overlaying the reinforcement fiber web (b) and are subsequently transported towards the separating point beneath the double drum assembly 14 in a direction shown by the arrow R while passing through the furnace housing 26. At the time the thermoplastic resin sheet (a) overlaying the reinforcement fiber web (b) arrives at the separating point, the thermoplastic resin sheet (a) is positioned below the reinforcement fiber web (b) with the thermoplastic resin having partially penetrated into the interstices in the reinforcement fiber web (b) to form the preformed resinous layer d. This preformed resinous layer d departs from the rotary drum 13 at the separating point and is drawn towards the impregnating machine 7 as will be described later.

During the transportation of the thermoplastic resin sheet (a) overlaying the reinforcement fiber web (b) around and by the rotary drum 13 then driven in one direction shown by the arrow R, both of the thermoplastic resin sheet (a) and the reinforcement fiber web (b) are heated by the electric heater 15 and are, at the same time, drawn close towards the peripheral wall of the rotary drum 13 by the effect of the suction force created at a location diagonally upwardly of the double drum assembly 14 by the suction unit 19 comprising the vacuum pump 18 and the suction box 16. The thermoplastic resin sheet (a) then heated to a temperature sufficient to melt or soften the thermoplastic resin forming the sheet (a) is sucked under the influence of the suction force so as to partially penetrate uniformly into the interstices in the reinforcement fiber web (b) to provide the preformed resinous layer d. Partly because the degree of pre-impregnation, that is, the percentage of the amount of the thermoplastic resin which has been partly penetrated into the interstices in the reinforcement fiber web (b) during the pre-impregnation process, is selected to be over 30% and partly because the suction takes place at the location diagonally upwardly of the rotary drum 13 and above a horizontal plane passing through the axis of rotation of the rotary drum 13, the thermoplastic resin in melt or softened state will not droop downwardly by the effect of gravitational force.

As the reinforcement fiber web (b) having impregnated partly with the thermoplastic resin in the manner as hereinabove described approaches the separating point substantially beneath the double drum assembly 14, one of surfaces of the reinforcement fiber web (b) opposite to the surface which has been covered by the thermoplastic resin sheet (a) is oriented upwardly having been reversed with respect to that at the supply point above the double drum assembly 14. Therefore, where the reinforcement fiber web (b) is employed in the form of a mat in which reinforcement fibers are bonded together by the use of a binder, the reinforcement fibers will not fall downwards even though the binder is melted under the influence of the heat.

The preformed resinous layer d separating at the separating point away from the rotary drum 13 is subsequently transported towards the impregnating device 7 through the transport guide 27 while heated by the upper and lower rows of the electric heaters 15A during the passage therethrough. As the preformed resinous layer d enters the nipping passage between the conveyor belts 1A and 1B the additional sheet e of thermoplastic resin which may be of a composition identical with that of the thermoplastic resin sheet (a) is supplied into the nipping passage continuously from the second supply unit 12 so as to overlay an upper surface of the preformed resinous layer d to form the three-ply resinous layer. During the transportation of the three-ply resinous layer through the nipping passage effected during the synchronized drive of the upper and lower conveyor belts 1A and 1B, the three-play resinous layer is progressively inwardly compacted across the thickness thereof. At the same time, the three-ply resinous layer moving in the nipping passage between the upper and lower conveyor belts 1A and 1B is heated by the heating unit 4, which may be a far-infrared radiating heater, a hot-air supply device or a high frequency heater, to a temperature higher than the temperature at which thermoplastic resin used to form the thermoplastic resin sheets (a) and (b) to be melted or softened and, therefore, the thermoplastic resin used to form the thermoplastic resin sheets (a) and e penetrates into the interstices in the reinforcement fiber web (b) while being integrated together, thereby providing the fiber reinforced thermoplastic sheet-shaped molding.

It is to be noted that, during the pre-impregnation process which has taken place during the transportation of the thermoplastic resin sheet (a) overlaying the reinforcement fiber web (b) around and by the rotary drum 13, 30% or higher of the reinforcement fiber web (b) has been pre-impregnated with the thermoplastic resin, that is, 30% or higher pre-impregnation has taken place. Therefore, the impregnating speed accomplished by the impregnating machine 7 can be accelerated considerably as compared with the system in which no pre-impregnation process is employed and, therefore, the total time required to complete the intended fiber reinforced thermoplastic sheet-shaped molding can be advantageously reduced considerably. In addition, the heating time can also be reduced correspondingly and, therefore, any possible thermal deterioration of the thermoplastic resin used to form the thermoplastic resin sheets (a) and e can be advantageously minimized.

Thereafter, while inwardly compacted by the conveyor belts 1A and 1B, the three-ply resinous layer in the nipping passage is cooled to solidify, thereby completing the formation of the fiber reinforced thermoplastic sheet-shaped molding.

It is to be noted that, in the practice of the method of the present invention, where the thermoplastic resin sheet e supplied from the second supply unit 12 is in the form of a sheet of polyethylene terephthalate of a kind having no affinity with water, the polyethylene terephthalate sheet should be dried to remove a moisture component before it is used for the supply onto the nipping passage between the conveyor belts 1A and 1B.

Figure 5:
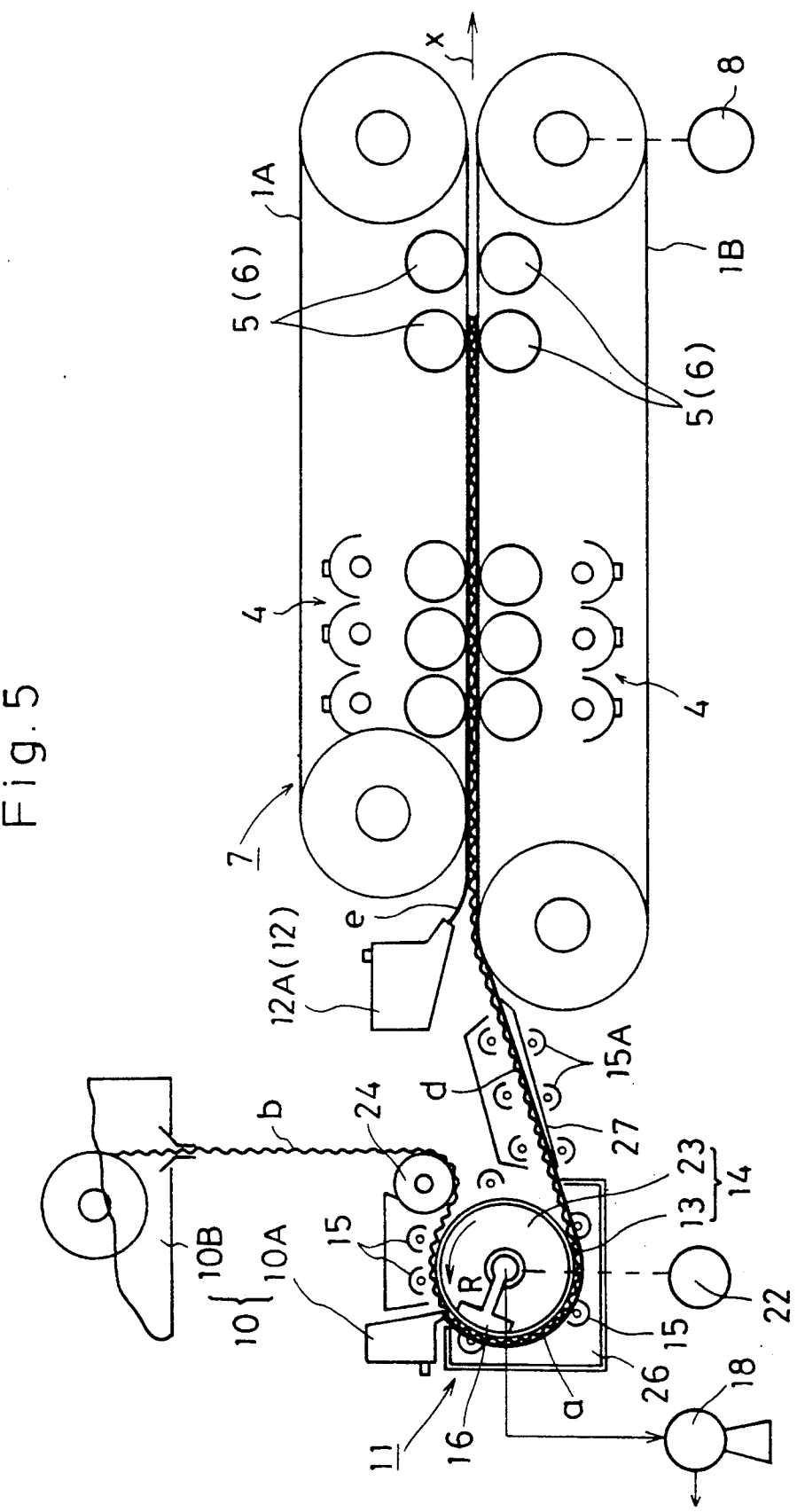
FIG. 5 is a schematic side sectional view of the manufacturing apparatus according to a second preferred embodiment of the present invention.

Referring now to FIG. 5 which illustrates the impregnating apparatus according to the second preferred embodiment of the present invention in schematic side sectional representation, the apparatus shown therein differs from that according to the first embodiment of the present invention in that, instead of the supply roll of thermoplastic resin sheet e used as the second supply device 12 in the impregnating apparatus according to the first preferred embodiment, a plastics extruder 12A is employed as the second supply unit for extruding thermoplastic resin onto the preformed resinous layer so as to cover an upper surface thereof. The other component parts of the impregnating apparatus shown in FIG. 5 are substantially identical with those of the impregnating apparatus shown in FIG. 1 except for the details of the second supply unit and, therefore, the details thereof will not be reiterated for the sake of brevity.

As compared with the impregnating apparatus shown in FIG. 1, the impregnating apparatus shown in FIG. 5 according to the second preferred embodiment of the present invention is advantageous in respect of the cost of installation and the efficiency because neither equipment nor supply line is required for the formation and supply of the additional sheet of thermoplastic resin such as required in the impregnating apparatus of FIG. 1.

Also, where the thermoplastic resin having no affinity with water such as polyethylene terephthalate (PET) is employed and, therefore, the removal of the moisture content is required, a rolled sheet or film of such thermoplastic resin is difficult to dry and, if it be possible, a relatively bulky and expensive drying apparatus is required, accompanied in a reduction in production time because a relatively large drying time is required. Therefore, the impregnating apparatus according to the second embodiment of the present invention is advantageous in that no drying system is required because the thermoplastic resin is directly extruded from the extruder 12A onto the preformed resinous layer consisting of the reinforcement fiber web (b) partially impregnated with the thermoplastic resin sheet (a). It is to be noted that, in order to allow the plastics extruder 12A to extrude a thin film of thermoplastic resin e onto the preformed resinous layer, the plastics extruder 12A is preferred to be operatively coupled with a plastics metering unit 27.

Figure 6:
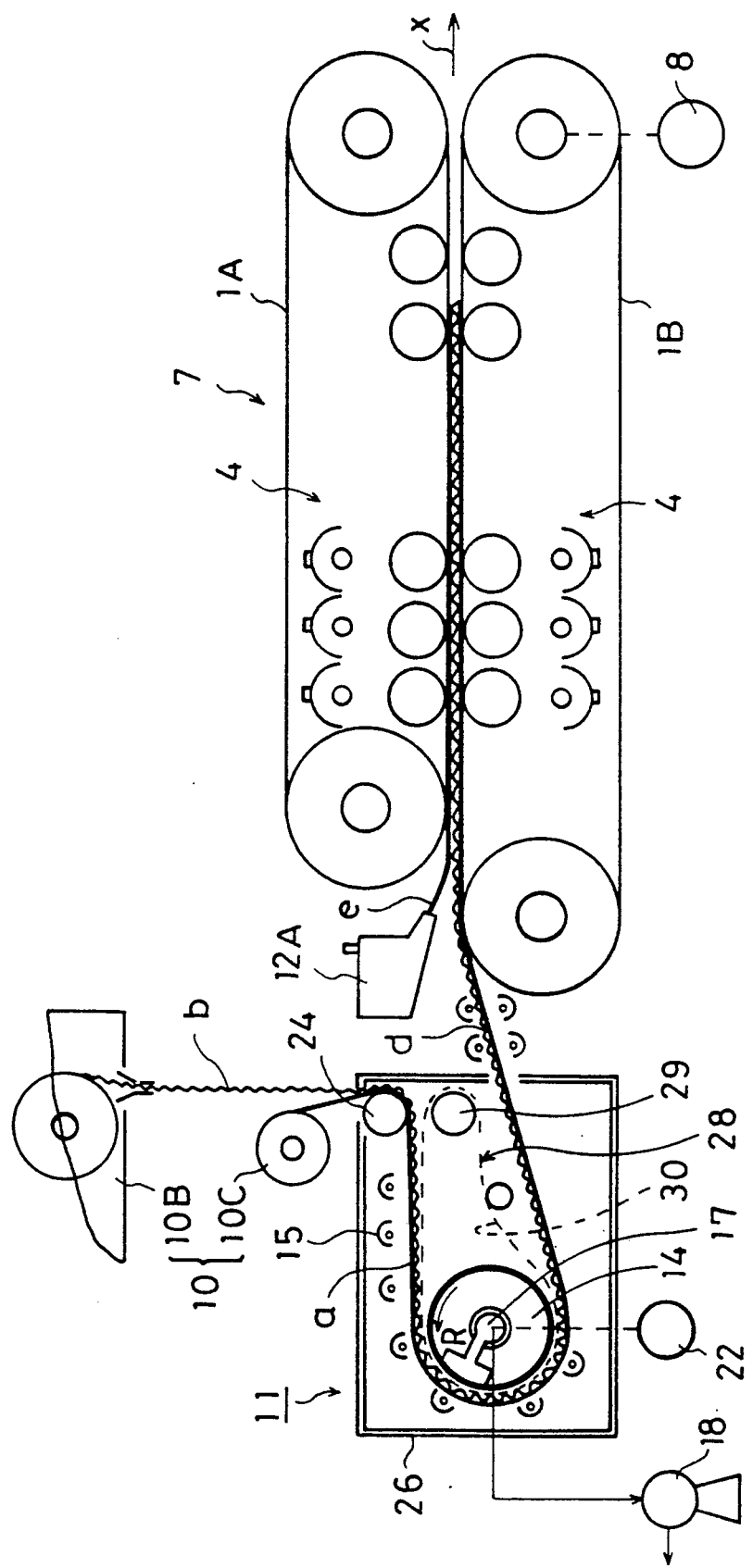
FIG. 6 is a schematic side sectional view of the manufacturing apparatus according to a third preferred embodiment of the present invention.

FIG. 6 illustrates the impregnating apparatus according to the third preferred embodiment of the present invention, which is suited for use with the thermoplastic resin having a relatively high melting point or a relatively high softening point.

Where the thermoplastic resin sheet (a) is drawn from the roll 10C onto the reinforcement fiber web (b), the heating of the thermoplastic resin during the transportation of the laminated layer by and around the rotary drum 13 of the double drum assembly 14 in the pre-impregnating device 11 requires a relatively long time before it is heated to the temperature required to melt or soften the thermoplastic resin, resulting not only in the use of the relatively bulky double drum assembly, but also in a difficulty in controlling the viscosity of the thermoplastic resin.

Therefore, in the third preferred embodiment of the present invention shown in FIG. 6, in order to render the speed of transportation of the laminated layer to be equal to the peripheral velocity of the rotary drum 13, a perforated belt mechanism 28 comprising a substantially endless perforated belt 30 in the form of, for example, a mesh belt or a punched belt trained around the rotary drum 13 and an idle roll 29 is positioned upstream of the double drum assembly 14 with respect to the direction of transportation of the laminated layer so that a portion of the laminated layer extending between the guide roll 24 and the rotary drum 13 can lie on an upper run of the perforated belt 30 and be heated by the electric heater 15 within the furnace housing 26, thereby to secure a sufficient length of time to facilitate a melting or softening of the laminated layer and also to control the temperature and the viscosity of the thermoplastic resin.

In other words, the laminated layer consisting of the thermoplastic sheet (a) and the reinforcement fiber web (b) supplied from the first supply unit 10 is, before it reaches the receiving point above the double drum assembly 14, heated by the electric heater 15 while lying on the upper run of the perforated belt 30 for a length of time substantially sufficient to allow the thermoplastic resin to melt or soften, and is then supplied onto the rotary drum 13 for the transportation thereof towards the separating point around the rotary drum 13. As is the case with the previously described first embodiment of the present invention, the thermoplastic resin forming a part of the laminated layer is forced under the influence of the suction force to penetrate partially into the interstices in the reinforcement fiber web (b) during the transportation thereof around and by the rotary drum 13 to provide the preformed resinous layer d. Thus, that portion of the laminated layer between the guide roll 24 and the rotary drum 13 is preheated according to the embodiment shown in FIG. 6. Thus, where the thermoplastic resin (a) is employed in the form of a film, the provision of the perforated belt mechanism 28 substantially obviates the necessity of providing a relatively high temperature in the vicinity of the rotary drum 13 and is therefore effective to minimize any possible thermal deterioration for the purpose of eventually stabilizing the quality of the resultant fiber reinforced thermoplastic sheet-shaped molding.

Figure 7:
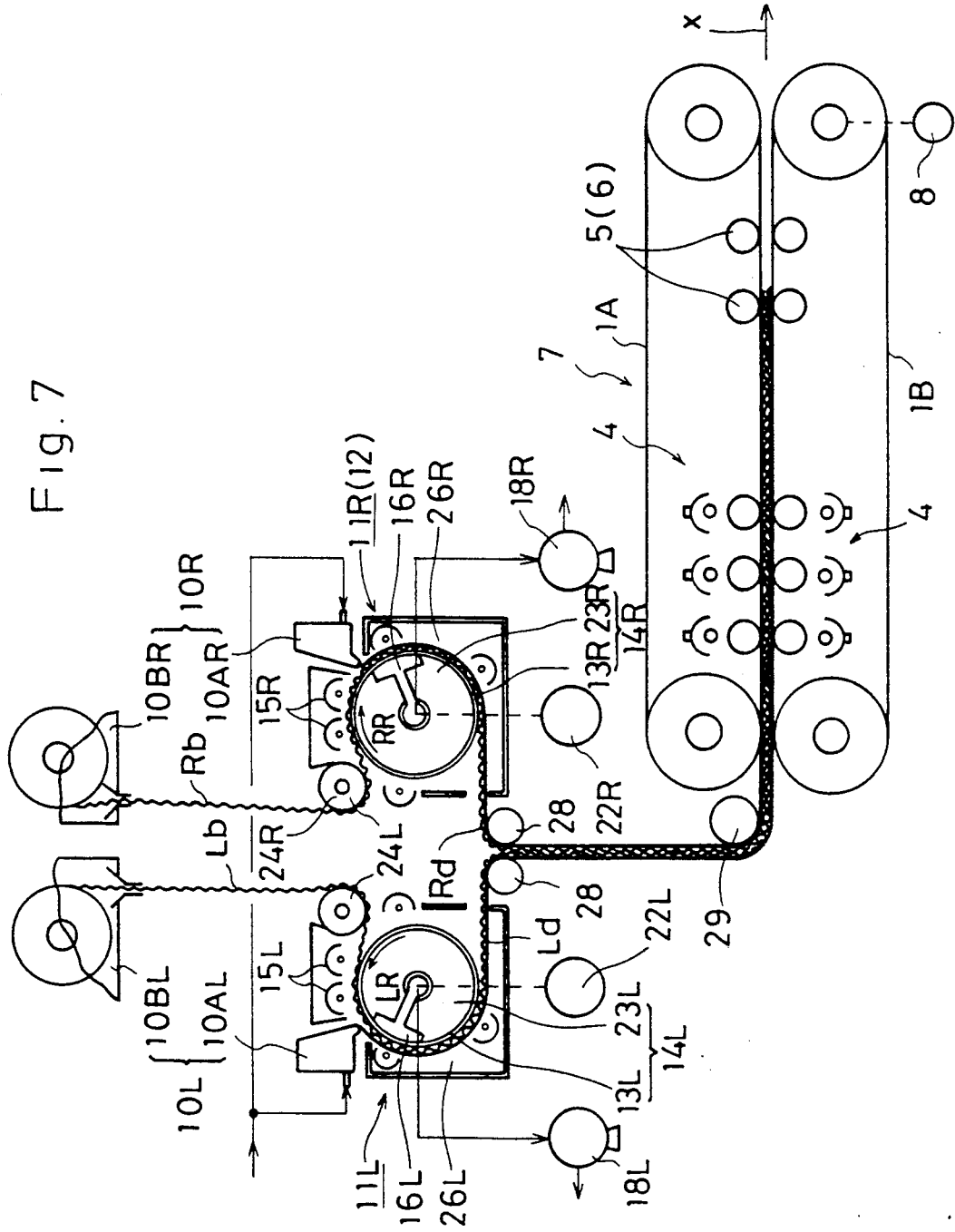
FIG. 7 is a schematic side sectional view of the manufacturing apparatus according to a fourth preferred embodiment of the present invention.

FIG. 7 illustrates the impregnating apparatus according to a fourth preferred embodiment of the present invention in schematic side sectional representation. In this embodiment of FIG. 8, two pre-impregnating devices 11L and 11R are employed, each comprising a double drum assembly 14L and 14R. The double drum assemblies 14L and 14R of the respective pre-impregnating devices 11L and 11R are positioned in side-by-side fashion and include respective rotary drums 13L and 13R which are supported for rotation in respective directions counter to each other as shown by the arrows LR and RR. The pre-impregnating devices 11L and 11R are so designed and so operated that respective laminated layers Ld and Rd delivered outwardly from the associated separating points immediately beneath the corresponding double drum assemblies 11L and 11R can be merged together by a pair of cooperating pinch rolls 28 to provide a four-ply resinous layer which is in turn supplied towards the roll-type impregnating machine 7 through a direction guide roll 29. In this embodiment of FIG. 7, the pre-impregnating device 11R shown on a right-hand portion of the figure of FIG. 7 constitutes the second supply unit 12 from which, instead of the additional sheet of thermoplastic resin employed in any one of the foregoing embodiments, a laminated layer consisting of the thermoplastic resin sheet and the reinforcement fiber web is supplied so that it can be merged with the similar laminated layer supplied from the pre-impregnating device 11L during its passage through a nipping area between the pinch rolls 28.

It is to be noted that the pre-impregnating devices 11L and 11R are of substantially identical construction, but are arranged in symmetrical relationship while each of the pre-impregnating devices 11L and 11R is of a construction substantially similar to the pre-impregnating device 11 hereinbefore discussed in connection with any one of the foregoing embodiments of the present invention. Therefore, shaped component parts of the pre-impregnating devices 11L and 11R are distinguished by the use of primes "L" and "R" to the respective reference numerals used to denote shaped component parts of the pre-impregnating device 11 in any one of the foregoing embodiments, the prime "L" being used for the reference numerals of the component parts of the left-hand pre-impregnating device while the prime "R" are used for the reference numerals of the component parts of the right-hand pre-impregnating device which forms the second supply unit 12.

The impregnating apparatus according to the fifth embodiment of the present invention can be utilized for the manufacture of the fiber reinforced thermoplastic sheet-shaped molding of a four-ply structure wherein the two reinforcement fiber webs held in contact with each other are intervened between the thermoplastic resins sheets during the manufacture. Since both of the first laminated layer Ld and the second laminated layer Rd have been pre-impregnated with the thermoplastic resin penetrating into the interstices in the reinforcement fibers and are subsequently laminated together, the time required to completely manufacture the fiber reinforced thermoplastic sheet-shaped molding of apparent four-ply structure can be advantageously reduced as compared with the case in which no pre-impregnating process is employed.

Where the thermoplastic resin extruded from the extruders 10AL and 10AR has a relatively high melting or softening point, or where films of thermoplastic resin having a relatively high melting or softening point are employed, perforated belt mechanisms each similar to or substantially identical with the perforated belt mechanism 28 shown in and described with reference to FIG. 6 may be employed in each of the pre-impregnating devices 11L and 11R for the purpose of controlling the temperature and/or viscosity of the thermoplastic resin employed.

In describing the embodiments of FIGS. 1 to 3, FIG. 5 and FIG. 6, respectively, reference has been made to a three-ply structure wherein the reinforcement fiber web (b) is sandwiched between the thermoplastic resin sheets (a) and (e). However, a five-ply structure may be employed wherein the three thermoplastic resin sheets and the two reinforcement fiber webs are alternately laid one above the other with the thermoplastic resin sheets occupying the outermost positions. In such case, as a second laminated layer supplied from the second supply unit 12 onto the roll-type impregnating machine 7, a roll of a sheet comprising the two thermoplastic resin sheets with the reinforcement fiber web intervening between those thermoplastic resin sheets may be employed. Alternatively, for the second supply unit 12, three rolls around which the thermoplastic sheets and the reinforcement fiber web are wound, respectively, may be employed so that they can be simultaneously supplied onto the roll-type impregnating machine 7.

Also, as far as the fifth embodiment of the present invention shown in FIG. 7 is concerned, arrangement may be made that a thermoplastic resin sheet can be either extruded by a plastics extruder, or supplied from a roll of the thermoplastic resin sheet, onto the first laminated layer Ld delivered from the pre-impregnating unit 11L so that the assembly can be subsequently laid on the second laminated layer Rd delivered from the pre-impregnating device 11R.

It is to be noted that, in any one of the first to fourth embodiments of the present invention shown in FIGS. 1 to 4, FIG. 5 and FIG. 6, respectively, the supply of the thermoplastic sheet e may be dispensed with.

The fiber reinforced thermoplastic sheet-shaped molding according to the present invention is the one which can be manufactured according to a method such as the method previously discussed. The resultant fiber reinforced thermoplastic sheet-shaped molding of the present invention can exhibit a substantially increased physical strength even though the void content is low, because the fiber reinforcement web is sufficiently impregnated with the thermoplastic resin. It has been shown that the fiber reinforced thermoplastic sheet-shaped molding manufactured according to the present invention has a void content (porosity) not higher than 1% having voids of a size not greater than 100 $\mu$m as measured along the major axis. This is in contrast to the prior art fiber reinforced thermoplastic sheet-shaped molding having a void content of not lower than 1.7% with voids of a size not smaller than 150 $\mu$m and, thus, the fiber reinforced thermoplastic sheet-shaped molding according to the present invention has been found superior to the prior art fiber reinforced thermoplastic sheet-shaped molding and is also considerably improved in strength.

While the present invention will be hereinafter demonstrated by way of several examples which are only for the purpose of illustration, but not limiting the present invention, physical characteristics hereinafter set forth of the fiber reinforced thermoplastic sheet-shaped moldings according to the present invention and also to the prior art are measured in the following manner.

Degree of Impregnation $$I(\%) = [(R - TP)/RF] \times 100$$

wherein R represents the amount (gram) of the laminated layer into which the thermoplastic resin has penetrated; TP represents the amount (gram) of the thermoplastic resin; and RF represents the amount (gram) of the reinforcement fibers.

Viscosity Retentivity

Thermoplastic polyester resin and thermoplastic polyester resin contained in the molding are dissolved in a solution of phenol/tetrachloroethane in weight ratio of 1:1 and were subsequently measured as to the intrinsic viscosity using a viscometer. A value obtained by dividing the intrinsic viscosity of the thermoplastic polyester resin contained in the molding by the intrinsic viscosity of the thermoplastic polyester resin is multiplied by 100 to give a percent value by which the degree of deterioration of the thermoplastic polyester resin was evaluated.

Melt Index Retentivity

The melt index retentivity MIR was determined using the following equation from the melt index MIo of polyolefine resin before being molded and the melt index MI of the same after having been molded.

$$MIR\ (\%) = [1 - (MI - MIo)/MIo] \times 100$$

The method employed for the determination of the melt indexes is stipulated in JIS-K-7210.

Void Content (1) Using a sample, which has been cut into a generally rectangular thin piece, a silicone grease was applied to all surface areas of the sample to form a water repellent coating. The sample was then measured as to the specific gravity by the use of a water displacement method, i.e., according to the following equation.

$$[A] = (W_o \times dm)/[(W_o - W_{S1}) + m + (W_s - W_o) \cdot (1 - dm/dg)]$$

wherein [A] represents the specific gravity; $W_o$ represents the weight of the sample as measured when placed in the air; $W_s$ represents the weight of the sample having the silicone grease applied thereto, as measured when placed in the air; $W_{s1}$ represents the weight of the sample having the silicone grease applied thereto, as measured when immersed in the water; m represents the weight of a holder needle used to hold the sample, as measured when immersed in the water; dm represents the specific gravity of water; and dg represents the specific gravity of the silicone grease.

(2) The sample is, after the specific gravity thereof has been measured, placed in an electric furnace heated to 650 C. to remove by burning a resinous component of the sample, followed by a measurement of a glass (fiber) content in the sample by the use of a weight measuring method. A stoichiometric specific gravity [B] of the sample is then determined from the measured glass content.

(3) Using the specific gravity [A] and the stoichiometric specific gravity [B], the void content is determined according to the following equation.

$$Void\ Content\ (\%) = 100 \times ([B] - [A])/[B]$$

Tensile Strength

The measurement of the tensile strength is based on a method stipulated in JIS-K-6911 of the Japanese Industrial Standards.

Void Size

While the section of the sample is examined using a commercially available scanning electron microscope, the distance along the major axis of an individual void is measured to determine the void size.

EXAMPLES 1 to 5

A softened thermoplastic resin sheet of 2.5 mm in thickness made of polyethylene terephthalate of 0.70 in [$\eta$] (unit: dl/g) was supplied from a plastics extruder onto a mat of chopped glass strands of 2,700 g/m$^2$ (unit) weight, which had been prepared by binding glass fibers, each having a fiber diameter of 11 microns and a fiber length of 50 mm, by the use of 3 wt % of a binder of unsaturated polyester type, to form a laminated layer. This laminated layer was subsequently passed through the pre-impregnating device of a construction shown in and described with reference to FIG. 1. During the transportation through the pre-impregnating device, the laminated layer was heated to 300 to 310 C. and at the same time sucked at a respective degree of suction, as tabulated in Table 1, for a respective length of time as tabulated in Table 1 to allow the thermoplastic resin to penetrate partially into the interstices in the reinforcement fiber mat thereby to form the preformed resinous layer.

The preformed resinous layer which had been preliminarily impregnated was then guided towards the belt-type impregnating machine of a construction shown in FIG. 1 and, while the film, 0.5 mm in thickness, of the same thermoplastic resin was supplied onto the preformed resinous layer so as to overlay one of the surfaces of the reinforcement fiber web opposite to the surface which had not been impregnated with the thermoplastic resin during the pre-impregnation process, the layers were heated to 310 C. to allow the thermoplastic resin to penetrate substantially completely into the interstices in the reinforcement fiber web, followed by cooling thereof at the cooling region in the belt-type impregnating machine to solidify the impregnated layer thereby to complete the manufacture of the fiber reinforced thermoplastic sheet-shaped molding.

The resultant fiber reinforced thermoplastic sheet-shaped molding has been found containing 40 wt % of the chopped glass strand mat. The tensile strength exhibited by the resultant fiber reinforced thermoplastic sheet-shaped molding was not lower than 16 kg/mm$^2$ and the viscosity retentivity thereof was not lower than 87%.

The impregnating time over which final impregnation was carried out in the belt-type impregnating machine to obtain the fiber reinforced thermoplastic sheet-shaped molding having a satisfactory tensile strength and a satisfactory resistance to deterioration was measured and is shown in Table 1 together with the degree of pre-impregnation and the viscosity retentivity of the thermoplastic resin used.

EXAMPLE 6

A softened thermoplastic resin sheet of 2.5 mm in thickness made of polypropylene of 150 grams per 10 minutes in melt index (MI) was supplied from a plastics extruder onto a mat of chopped glass strands of 1,800 g/m², which had been prepared by binding glass fibers, each having a fiber diameter of 11 microns and a fiber length of 50 mm, by the use of 3 wt % of a binder of unsaturated polyester type, to form a laminated layer. This laminated layer was subsequently passed through the pre-impregnating device of a construction shown in and described with reference to FIG. 1. During the transportation through the pre-impregnating device, the laminated layer was heated to 270 to 280 C. and at the same time sucked at a respective degree of suction, as tabulated in Table 1, for a respective length of time as tabulated in Table 1 to allow the thermoplastic resin to penetrate partially into the interstices in the reinforcement fiber mat thereby to form the preformed resinous layer.

The preformed resinous layer which had been preliminarily impregnated was then guided towards the belt-type impregnating machine of a construction shown in FIG. 1 and, while the film, 0.5 mm in thickness, of the same thermoplastic resin was supplied onto the preformed resinous layer so as to overlay one of the surfaces of the reinforcement fiber web opposite to the surface which had not been impregnated with the thermoplastic resin during the pre-impregnation process, the layers were heated to 280 C. to allow the thermoplastic resin to penetrate substantially completely into the interstices in the reinforcement fiber web, followed by cooling thereof at the cooling region in the belt-type impregnating machine to solidify the impregnated layer thereby to complete the manufacture of the fiber reinforced thermoplastic sheet-shaped molding.

The resultant fiber reinforced thermoplastic sheet-shaped molding has been found containing 40 wt % of the chopped glass strand mat.

The impregnating time over which final impregnation was carried out in the belt-type impregnating machine to obtain the fiber reinforced thermoplastic sheet-shaped molding having a satisfactory tensile strength and a satisfactory resistance to deterioration was measured and is shown in Table 1 together with the degree of pre-impregnation and the viscosity retentivity of the thermoplastic resin used.

The resultant fiber reinforced thermoplastic sheet-shaped molding exhibited a tensile strength of 12.1 kg/mm² and a melt index retentivity of 85%.

Comparisons 1 and 2

For the purpose of comparison with the fiber reinforced thermoplastic sheet-shaped molding according to the present invention, a fiber reinforced thermoplastic sheet-shaped molding was manufactured according to a method similar to that of the present invention, but no pre-impregnation process employed.

It has been found that, in order to obtain the fiber reinforced thermoplastic sheet-shaped molding for comparison purpose having a satisfactory tensile strength, the impregnating time taken at the heating region in the belt-type impregnating machine took 12 minutes or more with both of the melt index and the viscosity of the thermoplastic resin reduced considerably. The tensile strength of the sheet-shaped moldings were found very low.

Figure 8:
FIG. 8 is a microphotograph showing a fiber reinforced thermoplastic sheet-shaped molding manufactured according to the present invention.
Figure 9:
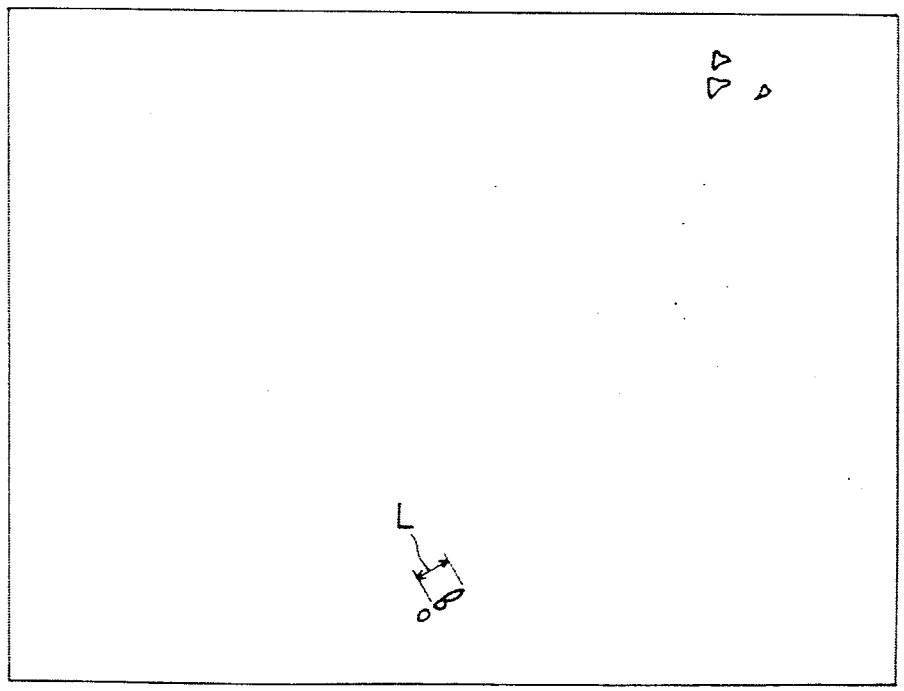
FIG. 9 is a schematic diagram showing voids found in the fiber reinforced thermoplastic sheet-shaped molding shown in FIG. 8.
Figure 10:
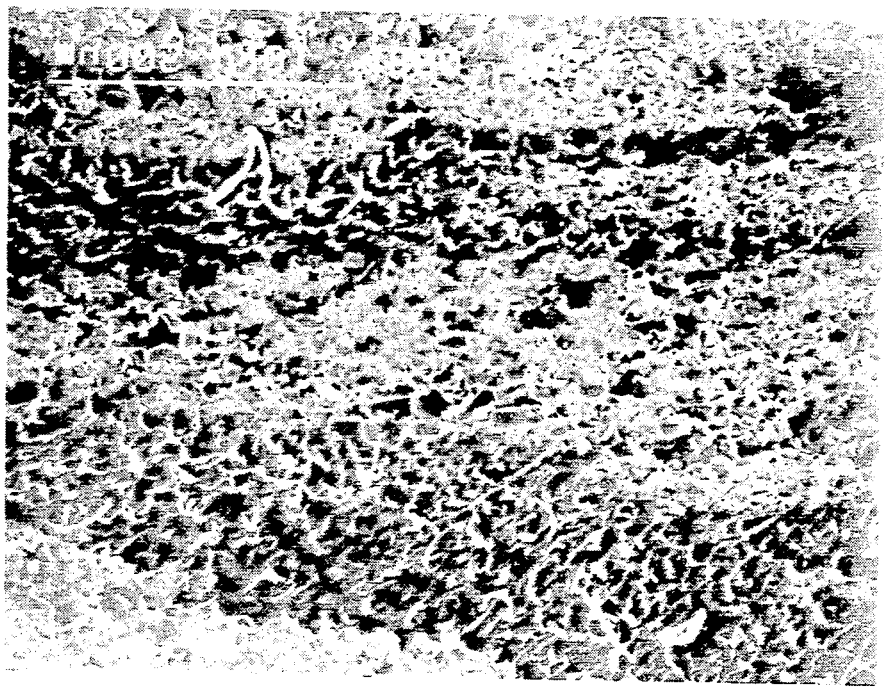
FIG. 10 is a microphotograph showing another fiber reinforced thermoplastic sheet-shaped molding manufactured according to the present invention.
Figure 11:
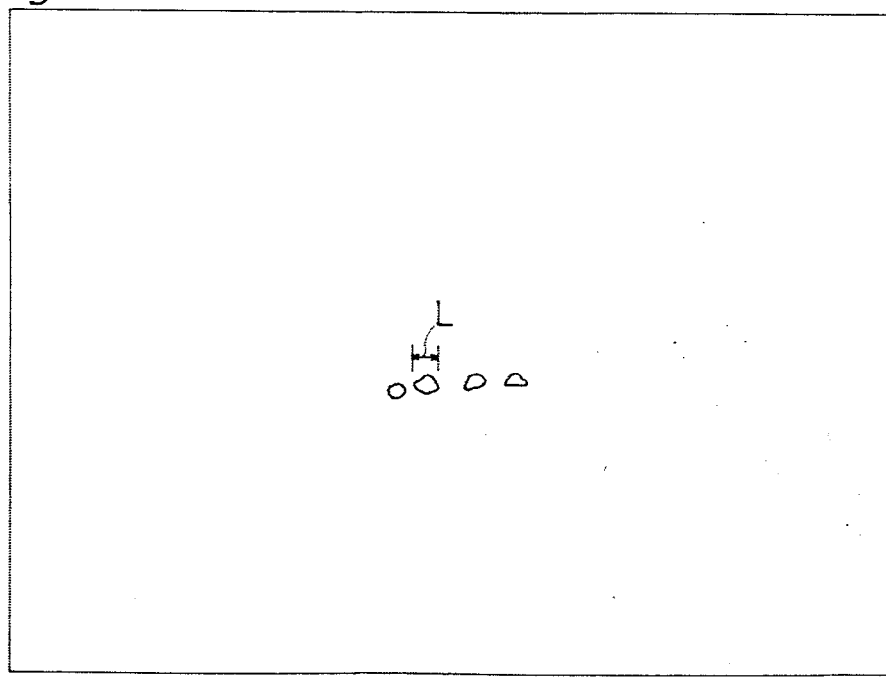
FIG. 11 is a schematic diagram showing voids found in the fiber reinforced thermoplastic sheet-shaped molding shown in FIG. 9.
Figure 12:
FIG. 12 is a microphotograph showing a further fiber reinforced thermoplastic sheet-shaped molding manufactured according to the present invention.
Figure 13:
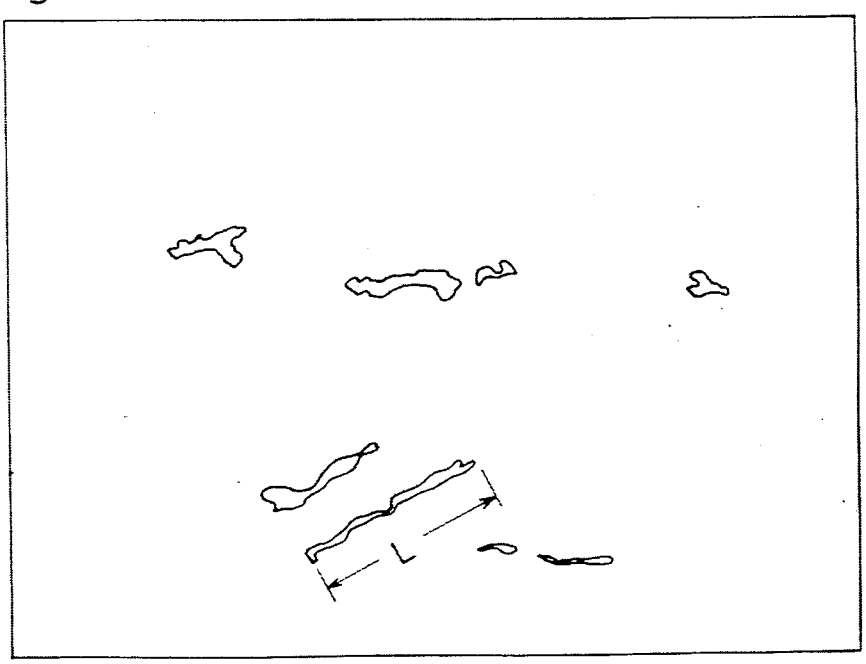
FIG. 13 is a schematic diagram showing voids found in the fiber reinforced thermoplastic sheet-shaped molding shown in FIG. 12.
Figure 14:
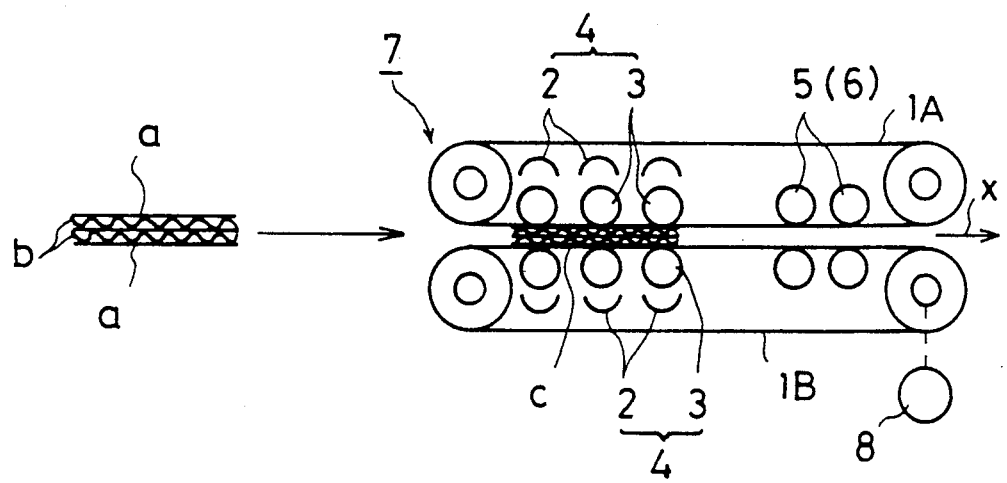
FIGS. 14 and 15 are schematic side sectional views showing the two prior art belt-type impregnating apparatus for the manufacture of the prior art fiber reinforced thermoplastic sheet-shaped moldings, respectively.
Figure 15:
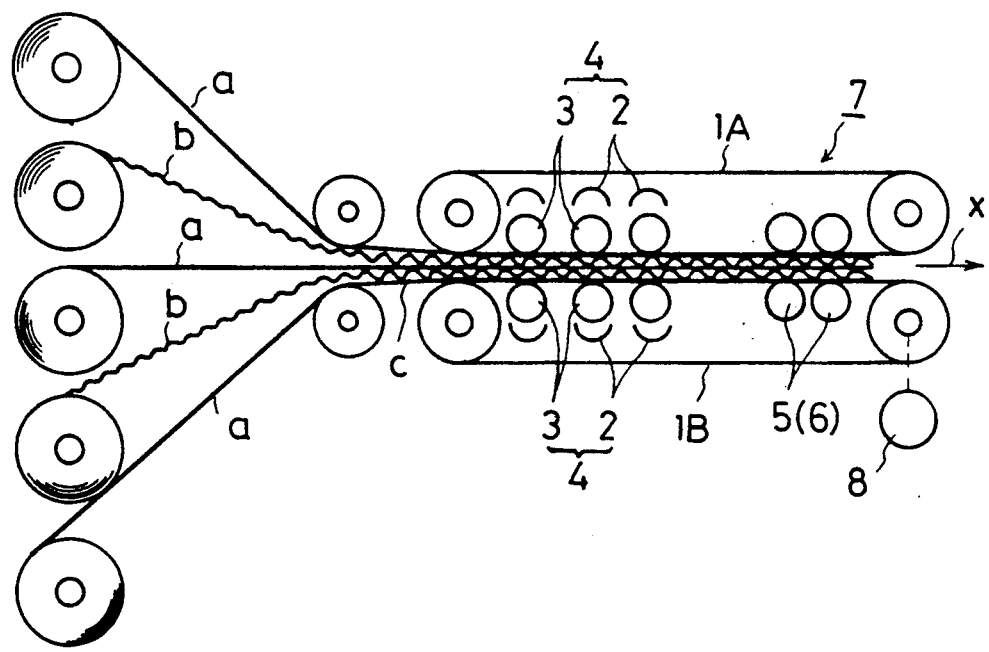

To demonstrate the superiority of the fiber reinforced thermoplastic sheet-shaped molding according to the present invention to the fiber reinforced thermoplastic sheet-shaped molding manufactured for comparison purpose with no pre-impregnating process employed, microphotographs of the respective transverse sections of the moldings of Examples 3 and 6 and Comparison 1, taken with the use of the electron microscope at a magnification factor of 200, are shown in FIGS. 8, 10 and 12, respectively. Diagrams showing the presence of voids in those moldings of Examples 3 and 6 and Comparison 1 are shown in FIGS. 9, 11 and 13, respectively.

TABLE 1

| | Pre-impregnating Conditions | | | | PET Viscosity Retentivity (%) | PP Melt Index Retentivity in Sheet | Void Content (%) | Tensile Strength (kg/mm²) | Void Major Axis (μm) |
|---|---|---|---|---|---|---|---|---|---|
| | Resin | Suction (Torr) | Suction Time (sec) | Impreg. Deg. (%) | Heating Time | | | | | |
| Exm 1 | PET | 150 | 15 | 80 | 2 min. 25 sec. | 89 | — | 0.7 | 16.4 | 30 |
| Exm 2 | PET | 400 | 15 | 72 | 3 min. 25 sec. | 86 | — | 0.8 | 16.2 | 40 |
| Exm 3 | PET | 400 | 30 | 98 | 15 sec. | 98.5 | — | 0.5 | 16.5 | 20 |
| Exm 4 | PET | 600 | 100 | 85 | 1 min. 50 sec. | 91.5 | — | 0.6 | 16.4 | 25 |
| Exm 5 | PET | 700 | 120 | 83 | 1 min. 30 sec. | 87.5 | — | 0.8 | 16.3 | 25 |
| Exm 6 | PP | 400 | 30 | 95 | 17 sec. | — | 85% | 0.8 | 12.1 | 20 |
| Comp 1 | PET | — | — | 0 | 12 min. 10 sec. | 75 | — | 1.8 | 13.0 | 130 |
| Comp 2 | PP | — | — | 0 | 12 min. 15 sec. | — | 70% | 1.7 | 9.5 | 150 |

(Note: Heating Time was measured in the belt-type impregnating machine.)

As can be understood from the diagrams of FIGS. 9 and 11, the fiber reinforced thermoplastic sheet-shaped molding according to each of Examples 3 and 6 has shown a relatively low void content having voids of not greater than 25 μm in size L as measured along the major axis, in contrast to the fiber reinforced thermoplastic sheet-shaped molding according to Comparison 1 shown in FIG. 13 which has exhibited a high void content having voids of about 140 μm in size L as measured along the major axis.

Noteworthy is that the fiber reinforced thermoplastic sheet-shaped molding according to the present invention is particularly excellent in that the void content is very low having voids of small size and, hence, exhibits an increased physical strength.

With the present invention having been described in connection with the preferred embodiments thereof, it has now become clear that the provision of the pre-impregnating process during which the web of reinforcement fibers is impregnated with the thermoplastic resin makes it possible to reduce the length of time required to completely impregnate the reinforcement fiber web with the thermoplastic resin as compared with the prior art wherein no pre-impregnation process is employed. The apparatus and the method according to the present invention both employing the pre-impregnating process are also effective to manufacture the intended fiber reinforced thermoplastic sheet-shaped molding at high productivity.

The fact that the use of the pre-impregnating process accelerates the speed at which the entire impregnation is carried out can be advantageously reduced reduces the length of time required to heat, thereby minimizing any possible thermal deterioration such as thermal decomposition while providing the fiber reinforced thermoplastic sheet-shaped molding of highly stabilized quality.

Moreover, during the pre-impregnating process taking place, the suction force is utilized to impregnate the reinforcement fiber web partially with the thermoplastic resin thereby to accelerate the subsequent final impregnation process and, therefore, not only can the formation of voids which would otherwise result from the presence of residue air bubbles be suppressed, but also the uniform impregnation of the reinforcement fiber web with the thermoplastic resin can be attained. This in turn brings about an improvement in physical strength, that is, performance, and quality of the fiber reinforced thermoplastic sheet-shaped molding In the event that, subsequent to the pre-impregnating process, the laminated layer consisting of the reinforcement fiber web and the thermoplastic sheet or sheets is reversed in position with the reinforcement fiber web positioned upwardly of the thermoplastic resin sheet, and where the reinforcement fiber web is employed in the form of a mat wherein reinforcement fibers are interlocked with each other by means of a binder, no reinforcement fibers will fall by gravity and scatter even though the binder is melted due to the heating of the laminated layer. Therefore, this can also bring about an improvement in product performance and quality of the intended fiber reinforced thermoplastic sheet-shaped molding according to the present invention.

Yet, the application of the second sheet of thermoplastic resin so as to overlay the reinforcement fiber web forming a part of the preformed resinous layer, which may be effected subsequent to the pre-impregnation process and prior to the final impregnation process, can result in the manufacture of the fiber reinforced thermoplastic sheet-shaped molding having no reinforcement fluffing from surfaces thereof, ensuring a high quality of the fiber reinforced thermoplastic sheet-shaped molding.

The employment of the polymer extruder as the supply unit from which the thermoplastic resin is supplied onto the reinforcement fiber web to form a film or sheet of thermoplastic resin thereon is effective to eliminate the necessity of a machine and equipments for the formation of the thermoplastic sheet. In addition, where the use is made of thermoplastic resin such as, for example, polyester resin, susceptible to deterioration in contact with a moisture component, the employment of the polymer extruder can substantially eliminate the necessity of use of a resin drying equipment and, hence, no drying time is involved, making it possible to reduce the cost of manufacture of the fiber reinforced thermoplastic sheet-shaped molding accompanied by an increased manufacturing efficiency.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although reference has been made to the employment of the fixed drum disposed inside the rotary drum, the fixed drum may not be always essential in the practice of the present invention and the suction box in such case may be so disposed as to open towards the peripheral wall of the rotary drum. Where the use of the fixed drum is dispensed with, the sealing means may be mounted on the peripheral lip region of the suction box and held in sliding contact with the peripheral wall of the rotary drum.

Accordingly, such changes and modifications are, unless they depart from the spirit and scope of the present invention as delivered from the claims annexed hereto, to be construed as included therein.

What is claimed is:

1. A method of manufacturing a fiber reinforced synthetic sheet-shaped material which comprises the steps of:
    applying a melt or softened state thermoplastic resin to a web of reinforcement fibers so as to cover one surface of the reinforcement fiber web;
    sucking the thermoplastic resin through the reinforcement fiber web to cause the thermoplastic resin to partially penetrate into interstices in the reinforcement fiber web thereby to form a first preformed sheet;
    while the first preformed sheet is compressed in a direction across a thickness thereof, heating the first preformed sheet to cause the thermoplastic resin to penetrate substantially completely into the interstices in the reinforcement fiber web thereby completing the fiber reinforced synthetic sheet-shaped; and
    applying a second sheet containing at least thermoplastic resin to the reinforcement fiber web of the first preformed sheet, said second sheet applying step being performed subsequent to the formation of the first preformed sheet and before the thermoplastic resin is caused to penetrate substantially completely into the interstices in the reinforcement fiber web.

2. The method of manufacturing the fiber reinforced synthetic sheet-shaped material as claimed in claim 1, wherein the thermoplastic resin is extruded in said melt or softened state onto one surface of the reinforcement fiber web.

3. The method of manufacturing the fiber reinforced synthetic sheet-shaped material as claimed in claim 1, wherein the thermoplastic resin is supplied in the form of a sheet or film onto one surface of the reinforcement fiber web.

4. The method of manufacturing the fiber reinforced synthetic sheet-shaped material as claimed in claim 1, wherein the thermoplastic resin is selected from the group consisting of. polyester resin and polyolefine resin.

5. A method of manufacturing a fiber reinforced synthetic sheet-shaped material which comprises the steps of:
    applying a melt of softened state thermoplastic resin to an upper surface of a web of reinforcement fibers so as to cover the upper surface of the reinforcement fiber web;
    sucking the thermoplastic resin sheet through the reinforcement fiber web to cause the thermoplastic resin to partially penetrate into interstices in the reinforcement fiber web thereby to form a first preformed sheet;

reversing the first preformed sheet to cause the reinforcement fiber web to lie above the thermoplastic resin sheet;

while the first preformed sheet is compressed in a direction across a thickness thereof, heating the first preformed sheet to cause the thermoplastic resin to penetrate substantially completely into the interstices in the reinforcement fiber web thereby completing the fiber reinforced synthetic sheet-shaped material; and applying a second sheet containing at least thermoplastic resin to the reinforcement fiber web of the first preformed sheet, said second sheet applying step being performed subsequent to the formation of the first preformed sheet and before the thermoplastic resin is caused to penetrate substantially completely into the interstices in the reinforcement fiber web.

6. An apparatus for manufacturing a reinforcement fiber synthetic sheet-shaped material which comprises:

a first supply unit for supplying a melt or softened state thermoplastic resin to a web of reinforcement fibers so as to cover one surface of the reinforcement fiber web;

a pre-impregnating device for sucking the thermoplastic resin through the reinforcement fiber web to cause the thermoplastic resin to partially penetrate into interstices in the reinforcement fiber web thereby to form a first preformed sheet; and a final impregnating device for heating the first preformed sheet while applying a compressive force thereto in a direction across a thickness thereof to cause the thermoplastic resin to penetrate substantially completely into the interstices in the reinforcement fiber web;

wherein said first supply unit continuously supplies said thermoplastic resin and said web of reinforcement fibers to provide a laminated layer having said thermoplastic resin sheet positioned above the reinforcement fiber web;

said pre-impregnating device includes a drum transport mechanism having a rotary drum supported for rotation in one direction for transporting the laminated layer while turning the laminated layer upside down as it is transported during a rotation of the rotary drum so that the laminated layer separates away from the rotary drum from a position generally beneath the rotary drum, a heating means for heating the laminated layer, and a suction means for developing a sucking force inside the rotary drum to suck the laminated layer close to the rotary drum with the reinforcement fiber web held in contact with an outer peripheral surface of the rotary drum during the transportation of the laminated layer around the rotary drum to cause the thermoplastic resin to partially penetrate into interstices in the reinforcement fiber web thereby to form a first preformed sheet; and said final impregnating device is operable to transport the first preformed sheet in one direction away from the drum transport mechanism and also operable to heat the first preformed sheet while applying a compressive force thereto in a direction transverse to the first preformed sheet to cause the thermoplastic resin to penetrate substantially completely into the interstices in the reinforcement fiber web;

said apparatus further comprising:

a second supply unit for supplying a second material, containing at least thermoplastic resin, onto an upper surface of the first preformed sheet, said second supply unit being disposed at a location upstream of the final impregnating device with respect to the direction of transportation.

7. The apparatus for manufacturing the fiber reinforced synthetic sheet-shaped material as claimed in claim 6, wherein said rotary drum forming a part of the drum transport mechanism is in the form of a generally cylindrical drum having a peripheral wall formed with a multiplicity of through-holes.

8. The apparatus for manufacturing the fiber reinforced synthetic sheet-shaped material as claimed in claim 6, wherein said first supply unit includes a plastics extruder for applying the thermoplastic resin in melt or softened state onto the surface of the reinforcement fiber web.

9. The apparatus for manufacturing the fiber reinforced synthetic sheet-shaped material as claimed in claim 6, wherein said first supply unit includes a supply roll around which the sheet or film of thermoplastic resin is wound, said thermoplastic resin sheet being supplied from the supply roll onto the surface of the reinforcement fiber web.

* * * * *